US011868986B2

(12) United States Patent
Abhinav et al.

(10) Patent No.: US 11,868,986 B2
(45) Date of Patent: Jan. 9, 2024

(54) SECURE PRESENTATION OF TRANSACTION CARD DATA OF NUMBERLESS TRANSACTION CARDS

(71) Applicant: Mastercard International Incorporated, Purchase, NY (US)

(72) Inventors: Kumar Abhinav, Forbesganj (IN); Ankush Solke, Amravati (IN); Aniket Anil Parab, Pune (IN); Manjunath More, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/331,374

(22) Filed: May 26, 2021

(65) Prior Publication Data

US 2021/0374719 A1 Dec. 2, 2021

(30) Foreign Application Priority Data

Jun. 2, 2020 (IN) .............................. 202021023048

(51) Int. Cl.
*G06Q 20/40* (2012.01)
*G06Q 20/32* (2012.01)
(Continued)

(52) U.S. Cl.
CPC ....... *G06Q 20/352* (2013.01); *G06Q 20/3278* (2013.01)

(58) Field of Classification Search
CPC ............. G06Q 20/352; G06Q 20/3278; G06Q 20/204; G06Q 20/3221; G06Q 20/3265;
(Continued)

(56) References Cited

U.S. PATENT DOCUMENTS 9,218,624 B2 12/2015 Moghadam
9,477,852 B1 * 10/2016 Neale ................. G06K 19/0723
(Continued)

OTHER PUBLICATIONS

M. Lahn, "How much does a server cost for app hosting?", Sep. 20, 2019, Servermania, retrieved from: https://web.archive.org/web/20220522034635/https://www.servermania.com/kb/articles/server-cost-for-apps/; full article available at: https://www.servermania.com/kb/articles/server-cost-for-apps/ (Year: 2019).*

*Primary Examiner* — Daniel S Felten
*Assistant Examiner* — Douglas W Pinsky
(74) *Attorney, Agent, or Firm* — Hovey Williams LLP

(57) ABSTRACT

A method for securely presenting transaction card data of a transaction card includes receiving, by a server, a pairing request to pair the transaction card with a user device. Based on the pairing request, the transaction card is paired with the user device by way of a pairing identifier. The server receives, from the user device, a data presentation request to present the transaction card data on the user device. In response to the data presentation request, the server validates the pairing between the user device and the transaction card based on the pairing identifier. The server communicates, to the user device, the transaction card data based on the validation of the pairing between the user device and the transaction card. The communicated transaction card data is presented on a user interface rendered on the user device.

14 Claims, 26 Drawing Sheets

(51) Int. Cl.
*G06Q 20/38* (2012.01)
*H04L 29/06* (2006.01)
*G06Q 50/00* (2012.01)
*G06F 16/28* (2019.01)
*G06Q 20/04* (2012.01)
*G06Q 20/34* (2012.01)

(58) Field of Classification Search
CPC ............ G06Q 20/363; G06Q 20/4012; G06Q 20/409; G06Q 20/353; G06Q 20/351; G06Q 20/348
See application file for complete search history.

(56) References Cited

U.S. PATENT DOCUMENTS

| | | | |
|---|---|---|---|
| 10,990,961 B1* | 4/2021 | Gupta | G06Q 20/341 |
| 2006/0106727 A1* | 5/2006 | Yellai | H04N 21/25816 |
| | | | 375/E7.009 |
| 2010/0030698 A1* | 2/2010 | Goodin | G07C 9/23 |
| | | | 705/76 |
| 2013/0030997 A1* | 1/2013 | Spodak | G06Q 20/3572 |
| | | | 705/41 |
| 2017/0024733 A1* | 1/2017 | Purves | G06Q 20/325 |
| 2017/0330187 A1* | 11/2017 | Kohli | G06Q 20/0855 |
| 2018/0047021 A1* | 2/2018 | Uppalapati | G06Q 20/385 |
| 2021/0004802 A1* | 1/2021 | Rule | G06V 20/20 |

* cited by examiner

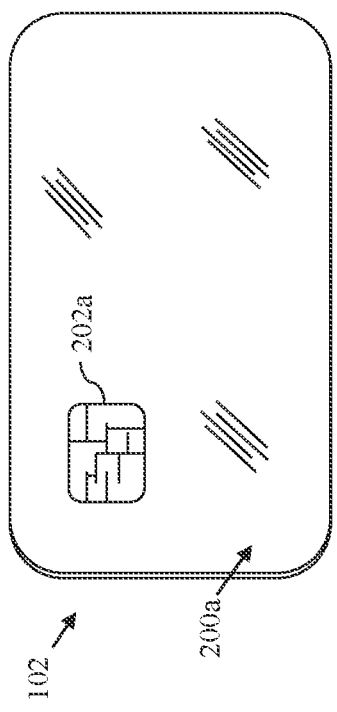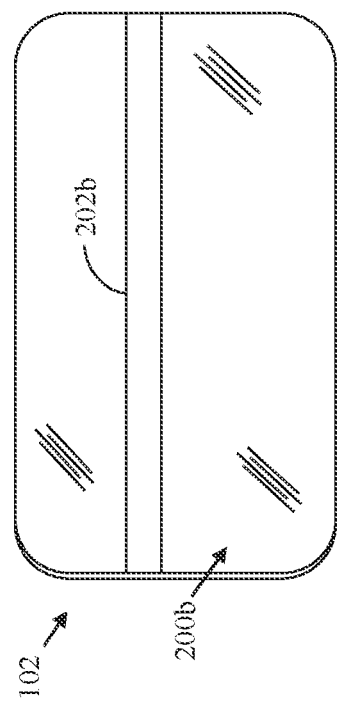
FIG. 2A
FIG. 2B

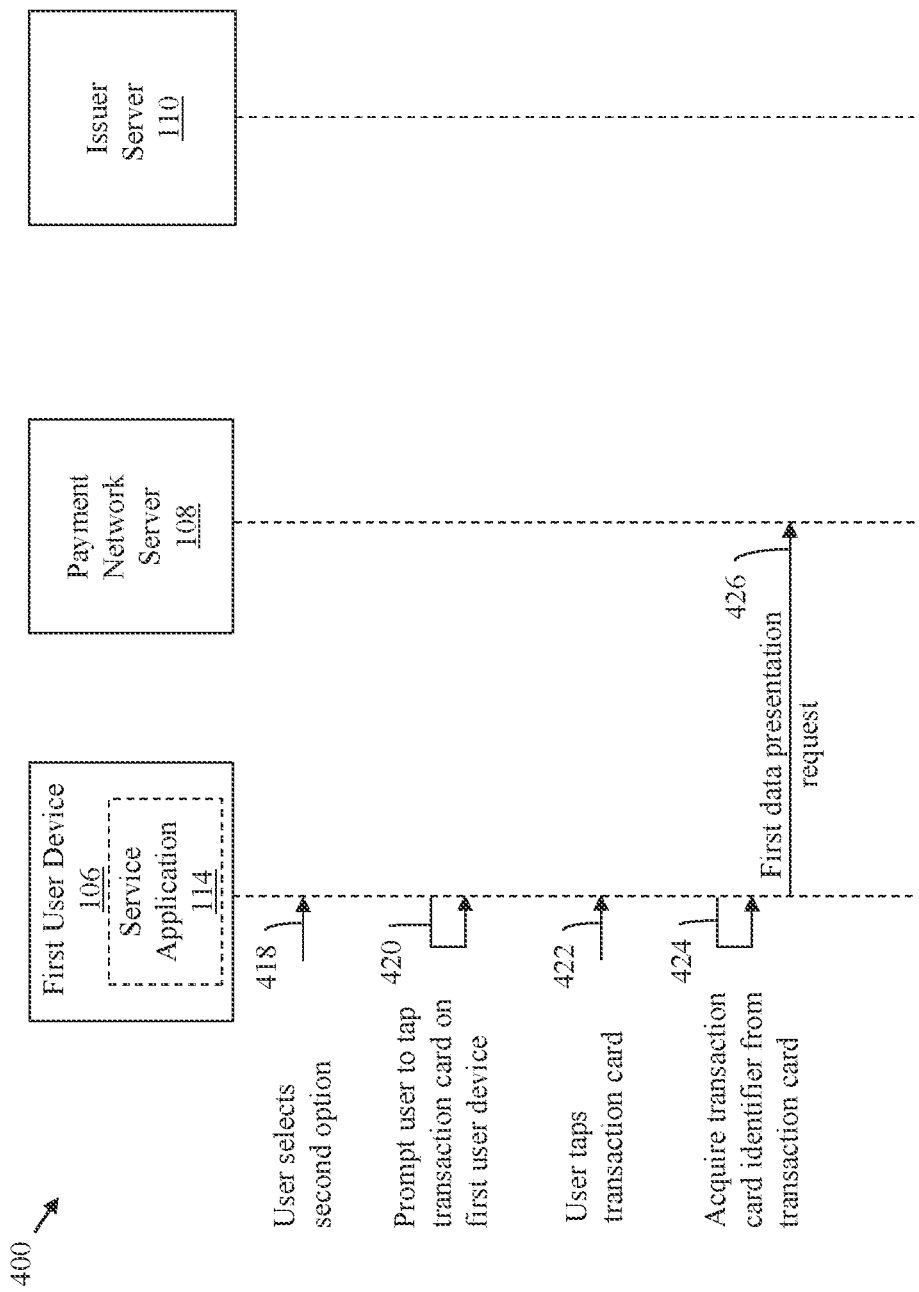

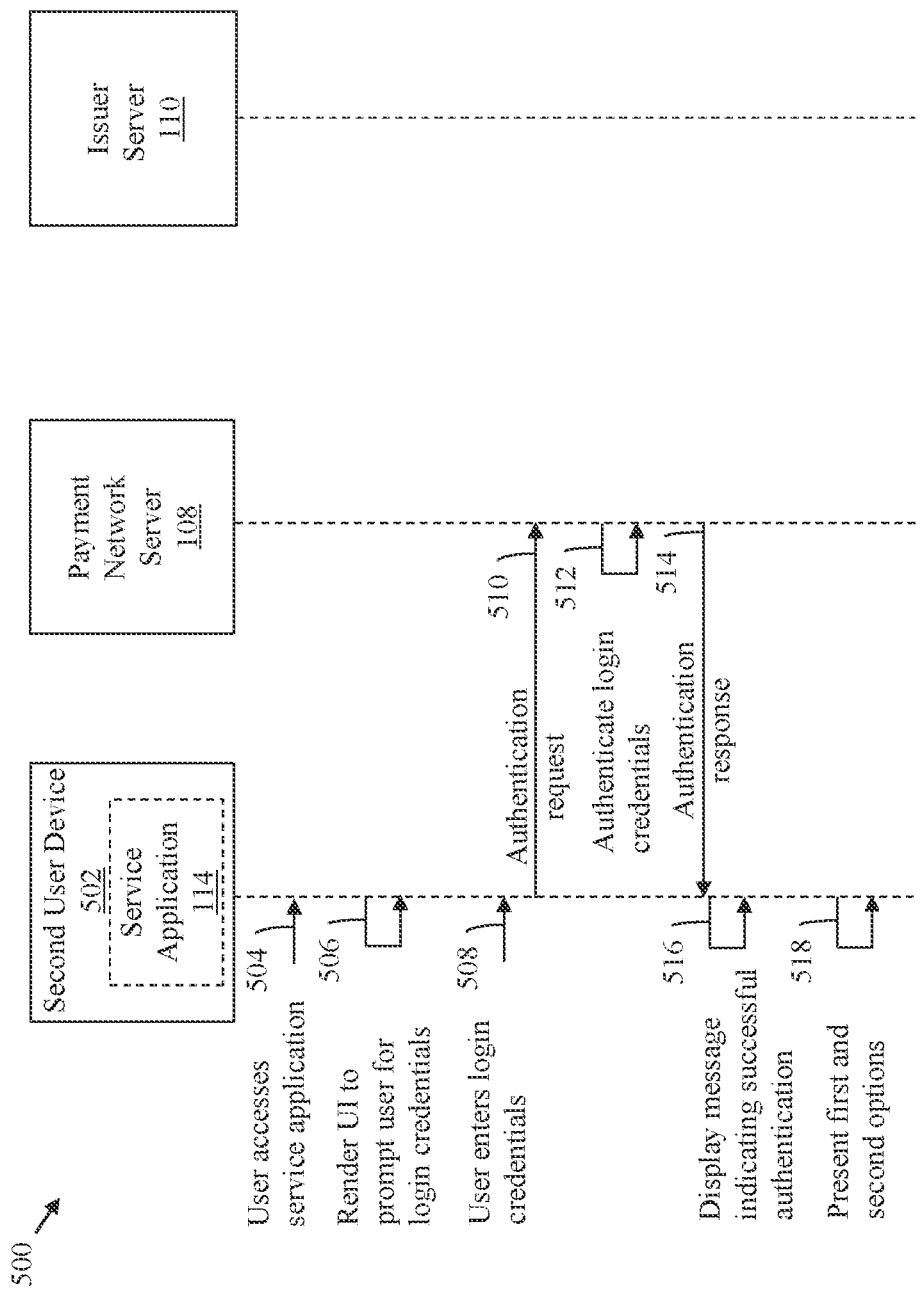

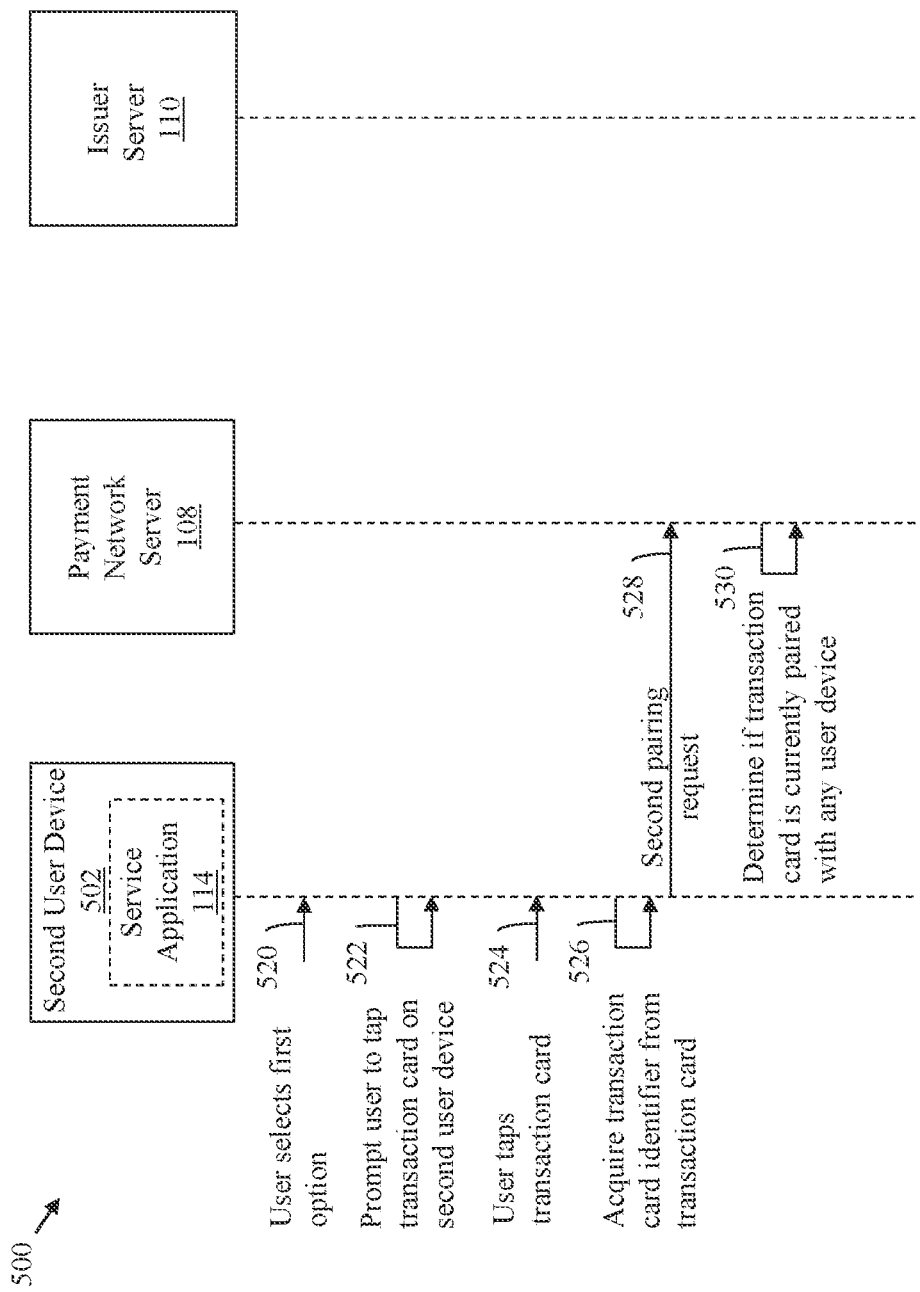

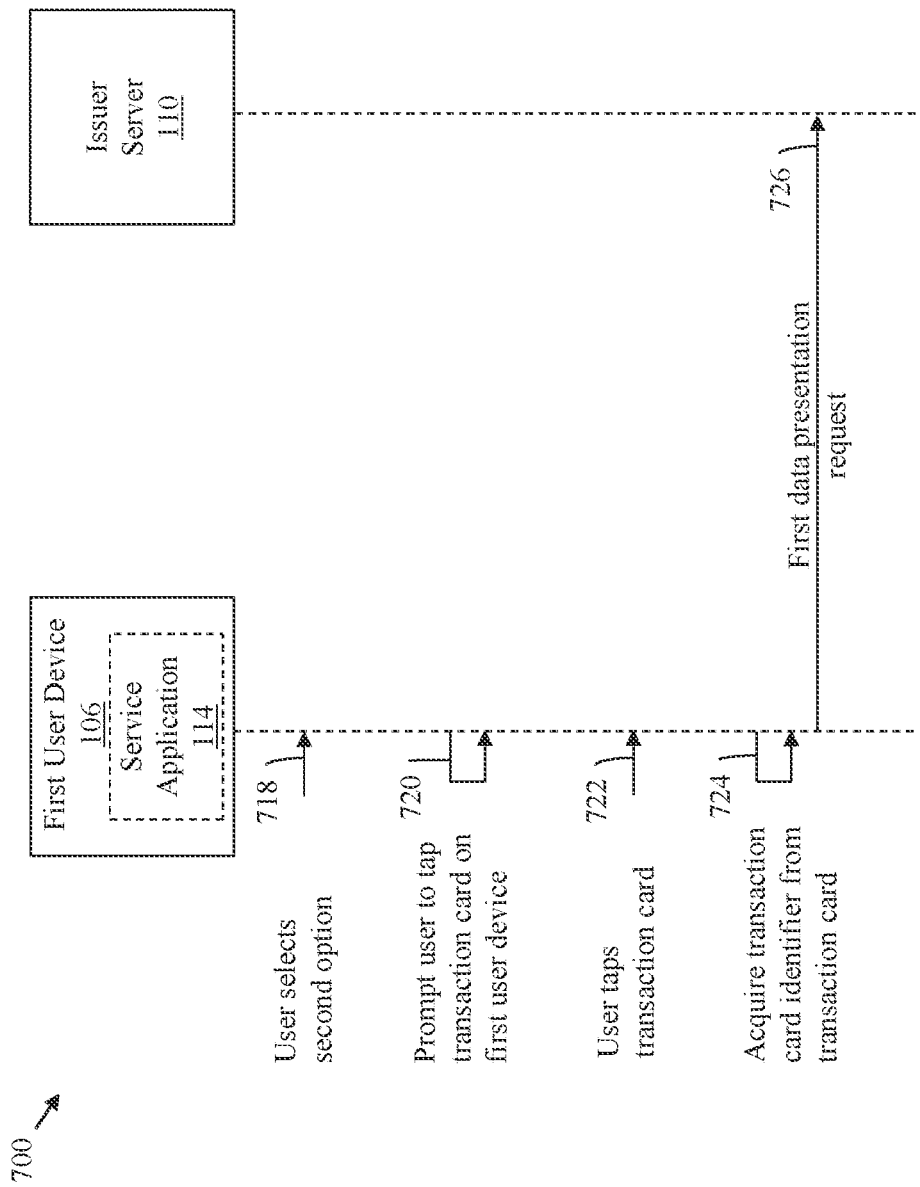

SECURE PRESENTATION OF TRANSACTION CARD DATA OF NUMBERLESS TRANSACTION CARDS

CROSS REFERENCE TO RELATED APPLICATIONS

This application claims priority to Indian Application No. 202021023048, filed Jun. 2, 2020, which is incorporated herein by reference in its entirety.

BACKGROUND

Field of the Disclosure

Various embodiments of the present disclosure relate generally to interfacing transaction cards and user devices. More particularly, various embodiments of the present disclosure relate to secure presentation of transaction card data of a numberless transaction card on a user device.

Description of the Related Art

Advancements in technology have led to widespread adoption of various payment modes and technologies such as transaction cards (e.g., credit cards, debit cards, or the like). Transaction cards are now used by users worldwide for performing quick and secure cashless transactions.

However, proliferation of transaction cards has been accompanied by a significant increase in transaction card fraud. Typically, an external surface of a transaction card is printed or embossed with transaction card data (e.g., a transaction card number, an expiry data, a card verification value, or the like) of the transaction card. This has allowed unscrupulous elements to surreptitiously read the printed transaction card data and, consequently, engage in various types of transaction frauds (e.g., fraudulent online transactions). Transaction frauds have resulted in substantial monetary losses for cardholders, merchants, acquirers, payment networks, and issuers. Blank or numberless transaction cards, whose external surfaces are devoid of some or all of transaction card data, have been introduced in an attempt to mitigate such transaction frauds. Cardholders of such blank or numberless transaction cards often require transaction card data to conduct online transactions.

A known solution for presenting transaction card data of a numberless transaction card (e.g., Apple Card) to a cardholder entails storing the transaction card data locally on a mobile application (e.g., Apple Pay application) installed on a mobile device of the cardholder. When the cardholder intends to view the transaction card data, the cardholder accesses the mobile application and the mobile application presents the transaction card data to the cardholder upon successful authentication of the cardholder by the mobile application. However, storing the transaction card data locally on the mobile application poses a data security risk. As a result, blank or numberless transaction cards have found few takers owing to a lack of a quick and secure method for viewing transaction card data.

In light of the foregoing, there is a need for a technical solution that solves the abovementioned problems and facilitates quick and secure presentation of transaction card data of a numberless or blank transaction card to a cardholder.

SUMMARY

In an embodiment of the present disclosure, a method for securely presenting transaction card data of a transaction card is provided. The method includes receiving, by a server, a first pairing request to pair the transaction card with a first user device. Based on the first pairing request, the transaction card is paired with the first user device, by the server, by way of a first pairing identifier. A data presentation request to present the transaction card data on the first user device is received by the server from the first user device. In response to the data presentation request, the pairing between the first user device and the transaction card is validated by the server based on the first pairing identifier. The transaction card data is communicated to the first user device by the server based on the validation of the pairing between the first user device and the transaction card. The communicated transaction card data is presented on a user interface rendered on the first user device.

In another embodiment of the present disclosure, a system for securely presenting transaction card data of a transaction card is provided. The system includes processing circuitry configured to receive a first pairing request to pair the transaction card with a first user device. The processing circuitry pairs, based on the first pairing request, the transaction card with the first user device by way of a first pairing identifier. The processing circuitry receives, from the first user device, a data presentation request to present the transaction card data on the first user device. In response to the data presentation request, the processing circuitry validates the pairing between the first user device and the transaction card based on the first pairing identifier. The processing circuitry communicates, to the first user device, the transaction card data based on the validation of the pairing between the first user device and the transaction card. The communicated transaction card data is presented on a user interface rendered on the first user device.

BRIEF DESCRIPTION OF DRAWINGS

Various embodiments of the present disclosure are illustrated by way of example, and not limited by the appended figures, in which like references indicate similar elements, and in which:

FIGS. 2A and 2B are schematic diagrams that illustrate front and rear views of the transaction card of FIG. 1, in accordance with an exemplary embodiment of the present disclosure;

FIGS. 4A-4C, collectively represent a process flow diagram that illustrates a process for securely presenting the transaction card data of the transaction card on a paired user device, in accordance with an exemplary embodiment of the present disclosure;

FIGS. 5A-5C, collectively represent a process flow diagram that illustrates a process for pairing the transaction card to another user device, in accordance with an exemplary embodiment of the present disclosure;

FIGS. 7A-7C, collectively represent a process flow diagram that illustrates a process for securely presenting the transaction card data of the transaction card on a paired user device, in accordance with another exemplary embodiment of the present disclosure;

Figure 1:
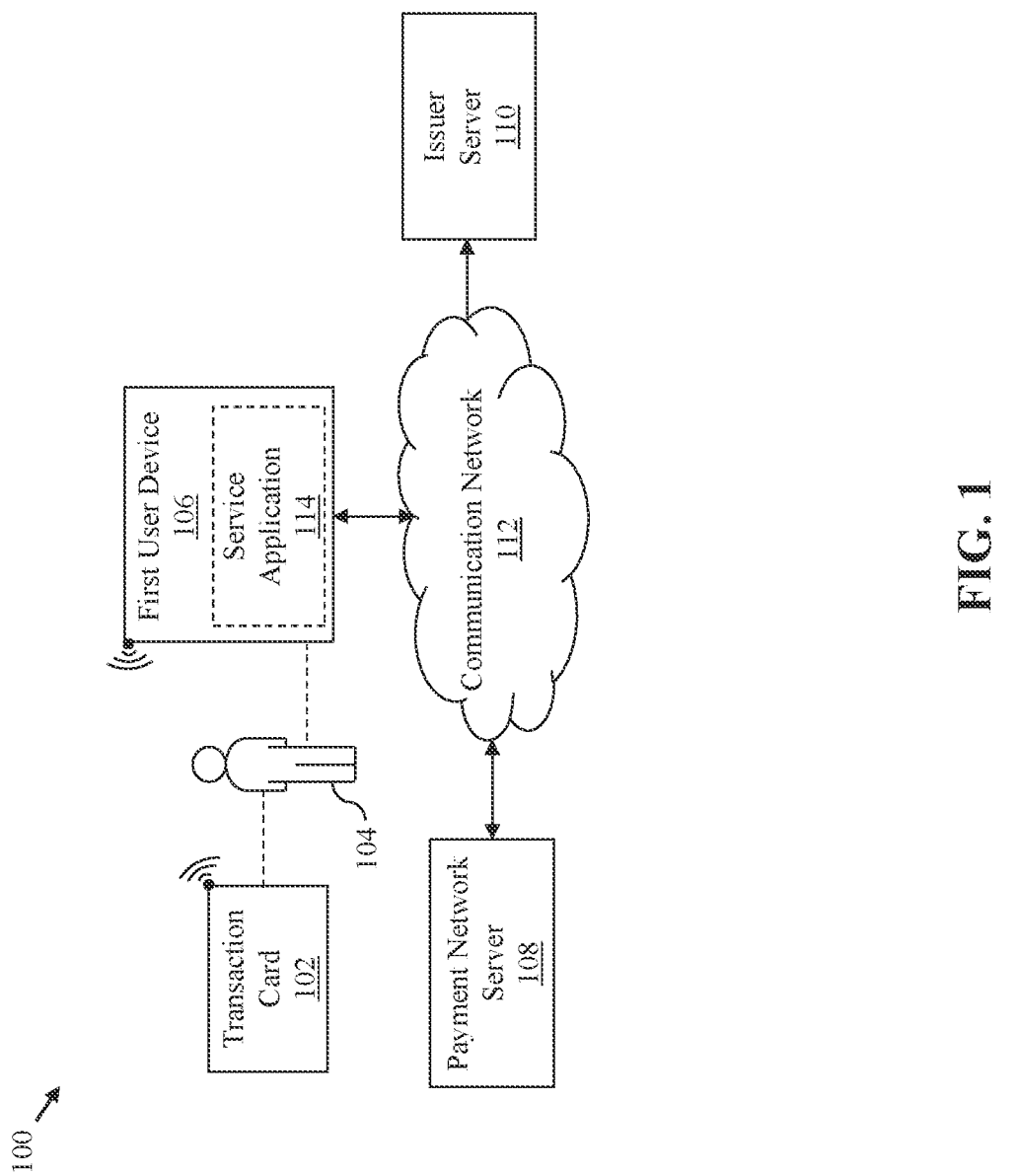
FIG. 1 is a block diagram that illustrates an exemplary environment for securely presenting transaction card data of a transaction card to a user, in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the present disclosure.

DETAILED DESCRIPTION OF EMBODIMENTS

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Conventional transaction cards are embossed with transaction card data on their external surfaces. This has allowed unscrupulous elements to engage in various types of transaction frauds. Blank or numberless transaction cards, whose external surfaces are devoid of some or all of transaction card data, have seen poor adoption rates by users, owing to lack of a quick and secure method for viewing transaction card data.

Various embodiments of the present disclosure provide a method and a system that solve the abovementioned problems by securely presenting transaction card data of a blank or numberless transaction card on a user device of a user, who is the cardholder of the transaction card. The present disclosure is implemented by a server (e.g., a payment network server or an issuer server) that includes processing circuitry for executing one or more operations to securely present the transaction card data of the transaction card on the user device. The processing circuitry receives, from the user device, a pairing request to pair the transaction card with the user device.

The pairing request is communicated by the user device to the processing circuitry based on near-field communication (NFC) interaction between the user device and the transaction card. The pairing request includes a transaction card identifier of the transaction card and a user-device identifier of the user device. Based on the pairing request, the processing circuitry pairs the transaction card with the user device by way of a pairing identifier. The pairing identifier is generated based on the transaction card identifier and the user-device identifier. Upon successful pairing between the transaction card and the user device, the processing circuitry stores, in a database, transaction card data of the transaction card in association with the pairing identifier. The processing circuitry receives, from the user device, a data presentation request to present the transaction card data on the user device. The data presentation request is communicated by the user device to the processing circuitry based on NFC interaction between the user device and the transaction card. In response to the data presentation request, the processing circuitry validates the pairing between the user device and the transaction card based on the pairing identifier. Upon successful validation of the pairing between the user device and the transaction card, the processing circuitry retrieves the transaction card data from the database and communicates, to the user device, the retrieved transaction card data. The communicated transaction card data is presented on a user interface rendered on the user device by a service application hosted by the processing circuitry. The transaction card data is temporarily presented on the user interface and is denied storage on the service application and the user device.

Thus, the method and system of the present disclosure enable quick and secure presentation of transaction card data of a transaction card on a user device of a user (i.e., the cardholder).

Terms Description (in Addition to Plain and Dictionary Meaning)

Transaction card is one of a debit card, a credit card, or a prepaid card. The transaction card is "blank" or "numberless", implying that an external surface of the transaction card is not embossed or printed with corresponding transaction card data. The transaction card includes a memory element such as a magnetic stripe or an electronic chip that stores the transaction card data of the transaction card.

Transaction card data is a set of attributes of a transaction card. The transaction card data of the transaction card includes, but is not limited to, a transaction card number, an expiry date, a card verification value, or the like. The transaction card data is stored in a memory element (such as a magnetic stripe or an electronic chip) of the transaction card.

Pairing request is a request initiated by a cardholder of a transaction card, by way of a user device, to pair the transaction card with the user device. The pairing request is indicative of a transaction card identifier of the transaction card and a user-device identifier of the user device. The transaction card is paired with the user device based on the pairing request. Pairing the transaction card with the user device is a pre-requisite for viewing transaction card data of the transaction card on the user device.

Pairing identifier is a numeric or alphanumeric code that is generated for pairing a transaction card with a user device. The pairing identifier is generated based on a combination of a transaction card identifier of the transaction card and a user-device identifier of the user device. The pairing identifier is used to uniquely identify the pairing between the transaction card and the user device.

Pairing is a process of digitally associating a transaction card with a user device. Pairing the transaction card with the user device enables presentation of transaction card data of the transaction card on the user device.

Data presentation request is a request initiated by a cardholder of a transaction card, by way of a user device, to view transaction card data of the transaction card on the user device. The data presentation request is indicative of a transaction card identifier of the transaction card and a user-device identifier of the user device. When the transaction card and the user device are paired, the transaction card data is presented to the cardholder on the user device based on the data presentation request.

Server or server arrangement is a physical or cloud data processing system on which a server program runs. The server may be implemented in hardware or software, or a combination thereof. In one embodiment, the server may be implemented in computer programs executing on programmable computers, such as personal computers, laptops, or a network of computer systems.

The server may correspond to one of an acquirer server, a payment network server, or an issuer server.

FIG. 1 is a block diagram that illustrates an exemplary environment 100 for securely presenting transaction card data of a transaction card 102 to a user 104, in accordance with an exemplary embodiment of the present disclosure. The environment 100 includes the transaction card 102, the user 104, a first user device 106, a payment network server 108, and an issuer server 110. The first user device 106, the payment network server 108, and the issuer server 110 may communicate with each other by way of a communication network 112 or through separate communication networks established therebetween.

The transaction card 102 is issued to the user 104 by a financial institution, such as an issuer, which maintains a payment account of the user 104. Examples of the payment account may include a bank account, a savings account, a current account, a credit account, a digital wallet account, or the like. Examples of the transaction card 102 may include, but are not limited to, a debit card, a credit card, or a pre-paid card. In other words, the user 104 is the cardholder of the transaction card 102. The transaction card 102 is associated with transaction card data such as a transaction card number, a card verification value (CVV), an expiry date, a name of a cardholder of the transaction card 102, or the like. In one embodiment, an exterior surface of the transaction card 102 is devoid of any transaction card data (i.e., the transaction card 102 may be a "blank" or "numberless" card). The transaction card 102 is configured to support one or more communication protocols, such as near-field communication (NFC) protocol, radio frequency identification (RFID) protocol, or the like. In one embodiment, the transaction card 102 includes a first NFC interface that incorporates NFC functionality in the transaction card 102.

The first user device 106 is a computing device of the user 104. Examples of the first user device 106 may include a mobile phone, a smartphone, a tablet, a phablet, a laptop, a computer, a wearable device having a display, or the like. The first user device 106 is configured to run or execute various web or mobile applications such as a service application 114. The first user device 106 is utilized by the user 104 to access the service application 114 for pairing the transaction card 102 with the first user device 106 and securely viewing the transaction card data of the transaction card 102. The first user device 106 is configured to support one or more communication protocols, such as NFC protocol or RFID protocol. For example, the first user device 106 may include a second NFC interface that incorporates NFC functionality in the first user device 106.

The payment network server 108 is a server arrangement, which includes suitable logic, circuitry, interface, and/or code, executable by the circuitry, for enabling the user 104 to view the transaction card data on the first user device 106 in a secured manner. The payment network server 108 is operated by a payment network (i.e., payment interchange) associated with the transaction card 102. In one embodiment, the payment network server 108 is configured to host the service application 114 that is executable on the first user device 106. Functionality of the payment network server 108 is explained in conjunction with FIGS. 4A-4C, 5A-5C, and 6A-6C.

The issuer server 110 is a server arrangement, which includes suitable logic, circuitry, interface, and/or code, executable by the circuitry, for enabling the user 104 to view the transaction card data on the first user device 106 in a secured manner. The issuer server 110 is operated by the issuer that has issued the transaction card 102 to the user 104 and maintains the payment account of the user 104. The issuer is a financial institution that manages payment accounts (e.g., digital wallet accounts or bank accounts) of multiple users (e.g., the user 104). Details of the payment accounts established with the issuer are stored as account profiles. Each account profile is indicative of various transaction cards issued to a corresponding user and a transaction history of the corresponding user. For example, an account profile of the user 104 may be indicative of the transaction card 102 issued to the user 104 and a transaction history of the user 104. The issuer server 110 credits and debits the payment accounts based on transactions made by the users from their respective payment accounts. In another embodiment, the issuer server 110 is configured to host the service application 114 that is executable on the first user device 106, in lieu of the payment network server 108.

The communication network 112 is a medium through which content and messages are transmitted between the first user device 106, the payment network server 108, and the issuer server 110. Examples of the communication network 112 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the user 104 utilizes the first user device 106 to access the service application 114. For the sake of brevity, it is assumed that the service application 114 is hosted by the payment network server 108. The user 104 accesses the service application 114 and initiates a first pairing request for pairing the transaction card 102 with the first user device 106. In a non-limiting example, the first pairing request is initiated by tapping the transaction card 102 on the first user device 106 (i.e., when the transaction card 102 is in contact with the first user device 106) or by placing the transaction card 102 within a first distance of the first user device 106. Tapping the transaction card 102 or placing the transaction card 102 within the first distance of the first user device 106 triggers the first user device 106 into communicating the first pairing request to the payment network server 108 hosting the service application 114. The first pairing request is indicative of a transaction card identifier of the transaction card 102 and a first user-device identifier of the first user device 106. The transaction card identifier may include the transaction card number, a first NFC interface number of the first NFC interface, or the like. Similarly, the first user-device identifier may include a contact number associated with the first user device 106, an international mobile equipment identity (IMEI) number of the first user device 106, a second NFC interface number of the second NFC interface, or the like.

Based on the received first pairing request, the payment network server 108 generates a first pairing identifier and pairs the transaction card 102 with the first user device 106 by way of the first pairing identifier. In one embodiment, the first pairing identifier is a combination of the transaction card identifier and the first user-device identifier. In another embodiment, the first pairing identifier is an alphanumeric code generated based on the transaction card identifier and the first user-device identifier. The payment network server 108 stores, in a first database in a first memory of the payment network server 108, the first pairing identifier that is indicative of successful pairing of the transaction card 102 with the first user device 106. The payment network server 108 communicates the first pairing identifier to the issuer server 110 to indicate successful pairing of the transaction card 102 with the first user device 106. The issuer server 110 stores, in a second database in a second memory of the issuer server 110, the transaction card data of the transaction card 102 in association with the first pairing identifier. The payment network server 108 further communicates, to the first user device 106, a first notification indicative of the successful pairing of the first user device 106 with the transaction card 102.

To view the transaction card data of the transaction card 102, the user 104 initiates a first data presentation request by accessing the service application 114 on the first user device 106. To initiate the first data presentation request, the user 104 may tap the transaction card 102 on the first user device 106 or place the transaction card 102 within the first distance of the first user device 106. This prompts the first user device 106 to communicate the first data presentation request to the payment network server 108. The first data presentation request is indicative of the first transaction card identifier and the first user-device identifier. In response to the first data presentation request, the payment network server 108 queries the first database using the first pairing identifier to determine whether the first user device 106 is paired with the transaction card 102. In other words, the payment network server 108 validates the pairing between the first user device 106 and the transaction card 102 based on the first pairing identifier.

Based on successful validation, the payment network server 108 communicates a first data retrieval request to the issuer server 110. The first data retrieval request includes the first pairing identifier. Based on the first data retrieval request, the issuer server 110 retrieves the transaction card data associated with the first pairing identifier and communicates a first data retrieval response, including the retrieved transaction card data, to the payment network server 108. The payment network server 108 communicates the retrieved transaction card data to the first user device 106. The service application 114 renders a user interface (UI) on a first display of the first user device 106 for presenting the received transaction card data to the user 104. Thus, the user 104 views the transaction card data of the transaction card 102 securely on the first user device 106. In the interest of data security, the transaction card data is only temporarily presented on the UI and is denied storage on the service application 114 or the first user device 106.

It will be apparent to a person of ordinary skill in the art that in a scenario where the service application 114 is hosted by the issuer server 110, the payment network server 108 may not be involved in the pairing of the transaction card 102 with the first user device 106. In such a scenario, functions performed by the payment network server 108 for pairing the transaction card 102 with the first user device 106 and enabling the user 104 to view the transaction card data on the first user device 106 may be performed by the issuer server 110, without deviating from the scope of the disclosure.

FIGS. 2A and 2B are schematic diagrams that illustrate front and rear views of the transaction card 102, in accordance with an exemplary embodiment of the present disclosure. FIGS. 2A and 2B illustrate the transaction card 102 as a "blank" or "numberless" transaction card.

With reference to FIG. 2A, the front view of the transaction card 102 illustrates a first (or front) surface 200a of the transaction card 102. The first surface 200a is shown to be devoid of the transaction card data such as the name of the cardholder, the transaction card number, the expiry date, or the like of the transaction card 102. In one embodiment, the first surface 200a includes an electronic chip 202a (i.e., a memory element of the transaction card 102) that electronically stores the transaction card data of the transaction card 102. The electronic chip 202a is a machine-readable data storage device (e.g., Europay, Mastercard and Visa chip) and supports NFC protocol.

With reference to FIG. 2B, the rear view of the transaction card 102 illustrates a second (or back) surface 200b of the transaction card 102. The second surface 200b is shown to be devoid of the transaction card data. In one embodiment, the second surface 200b includes a magnetic stripe 202b (i.e., another memory element) that stores the transaction card data of the transaction card 102. The transaction card 102 may further include other types of machine-readable data storage media such as bar codes, wireless transponder circuits, and/or the like for storing the transaction card data of the transaction card 102.

Functionality of EMV chips and magnetic stripes are well known to a person skilled in the art. Each of the electronic chip 202a and the magnetic stripe 202b may store the transaction card data of the transaction card 102. While the transaction card 102 is shown to include both the electronic chip 202a and the magnetic stripe 202b, it will be apparent to a person skilled in the art that the transaction card 102 may include only one of the electronic chip 202a or the magnetic stripe 202b, without deviating from the scope of the disclosure.

Figure 3A:
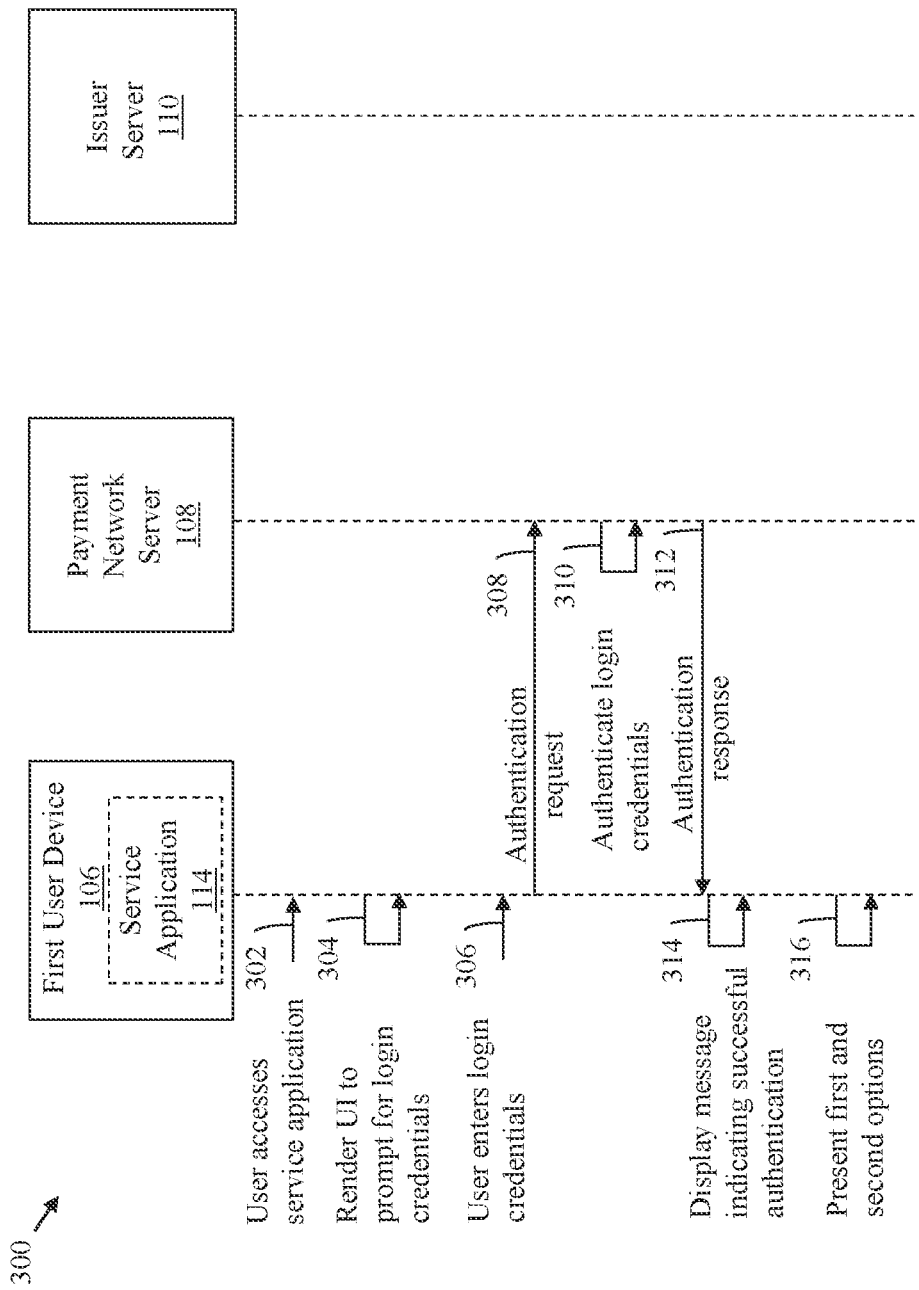
FIGS. 3A-3C, collectively represent a process flow diagram that illustrates a process for pairing the transaction card with a user device of FIG. 1, in accordance with an exemplary embodiment of the present disclosure.
Figure 3B:
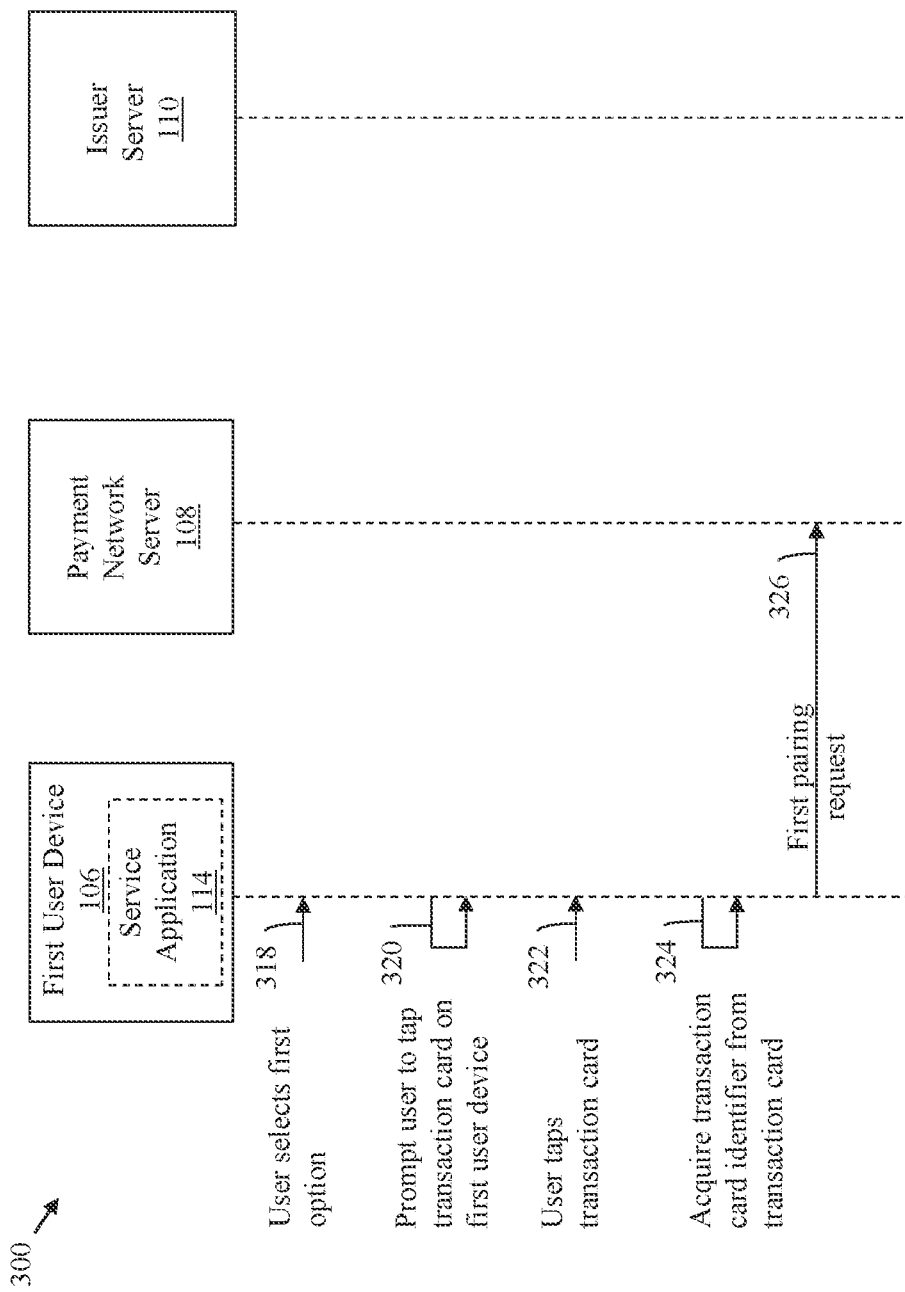
Figure 3C:
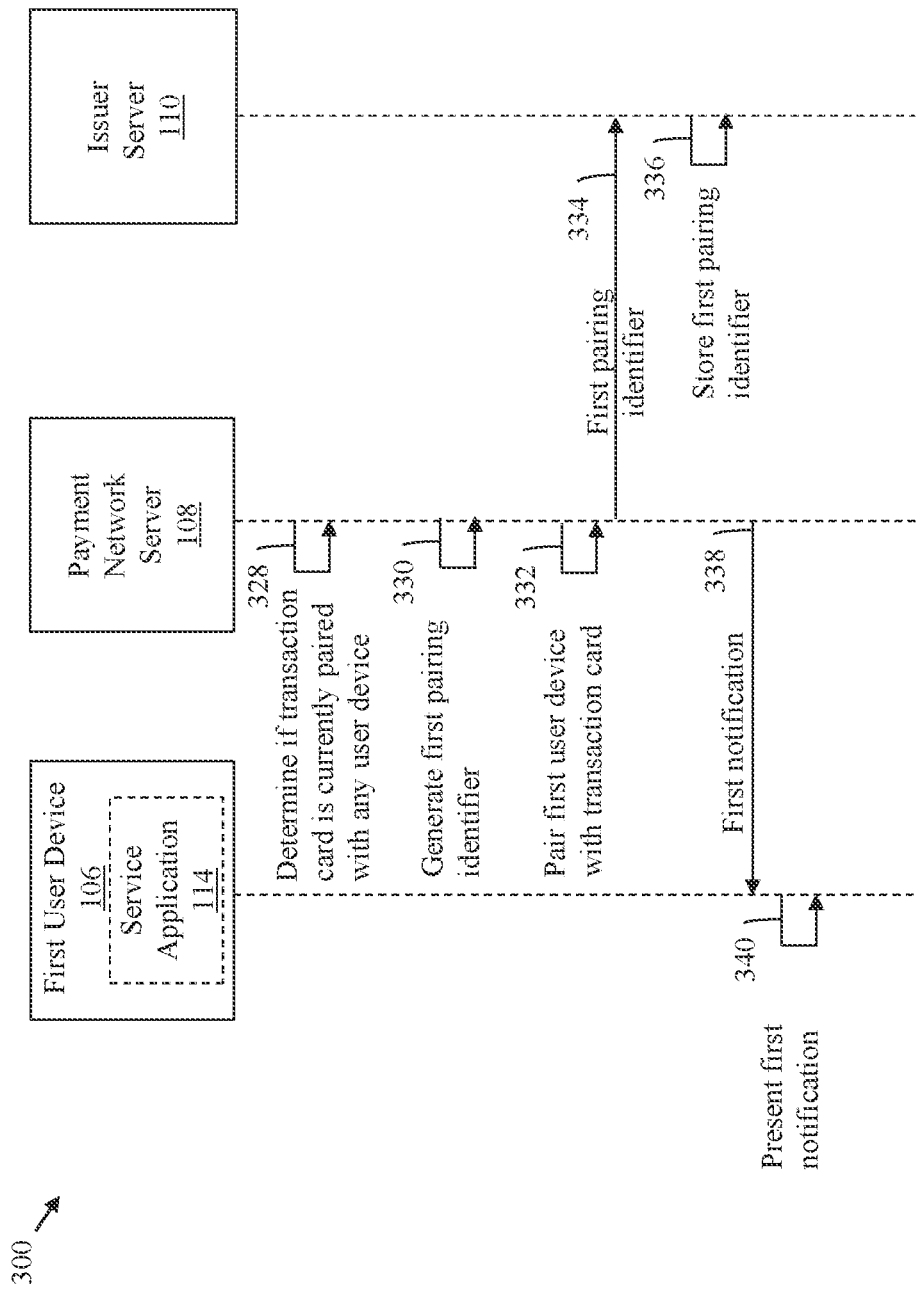

FIGS. 3A-3C, collectively represent a process flow diagram 300 that illustrates a process for pairing the transaction card 102 with the first user device 106, in accordance with an exemplary embodiment of the present disclosure. FIGS. 3A-3C describe a scenario where the service application 114 is hosted by the payment network server 108.

With reference to FIG. 3A, the user 104 accesses the service application 114 on the first user device 106 (as shown by arrow 302). The service application 114 renders an interactive UI on the first display of the first user device 106 and prompts the user 104 to provide login credentials (as shown by arrow 304) for logging into the service application 114. The user 104 enters the login credentials (e.g., a username and a password) through the UI (as shown by arrow 306). Based on the login credentials entered by the user 104, the first user device 106 communicates an authentication request to the payment network server 108 for authenticating the user 104 (as shown by arrow 308). The authentication request includes the entered login credentials. The payment network server 108 authenticates or validates the entered login credentials (as shown by arrow 310). Techniques for validating the login credentials will be well known to a person skilled in the art.

Based on the authentication, the payment network server 108 communicates an authentication response to the first user device 106 (as shown by arrow 312). The authentication response indicates whether the authentication is successful or not. If the authentication response is indicative of an authentication failure, the service application 114 may prompt the user 104 to re-enter the login credentials. In a non-limiting example, it is assumed that the authentication response is indicative of a successful authentication. Based on the authentication response, the user 104 is logged into the service application 114. Further, based on the authentication response, the service application 114 displays a message indicating that the user 104 is successfully authenticated (as shown by arrow 314). The service application 114 presents, on the UI, first and second options for pairing transaction cards with user devices and viewing transaction card data of the paired transaction cards, respectively (as shown by arrow 316). For the sake of brevity, it is assumed that the transaction card 102 is currently not paired with any user device and that the user 104 intends to pair the transaction card 102 with the first user device 106.

With reference to FIG. 3B, the user 104 selects the first option to initiate the first pairing request for pairing the first user device 106 with the transaction card 102 (as shown by arrow 318). Based on the selection of the first option, the service application 114 prompts the user 104 to tap the transaction card 102 on the first user device 106 (as shown by arrow 320). The user 104 taps the transaction card 102 on the first user device 106 (as shown by arrow 322). When the transaction card 102 is tapped on the first user device 106, the transaction card 102 and the first user device 106 interact by way of NFC. The first user device 106 (i.e., the service application 114) acquires the transaction card identifier of the transaction card 102 (as shown by arrow 324) during the NFC interaction between the first user device 106 and the transaction card 102. Consequently, the first user device 106 communicates the first pairing request to the payment network server 108 for pairing the first user device 106 with the transaction card 102 (as shown by arrow 326). The first pairing request is indicative of the transaction card identifier and the first user-device identifier.

With reference to FIG. 3C, based on the transaction card identifier and the first user-device identifier in the first pairing request, the payment network server 108 queries the first database to determine whether the transaction card 102 is currently paired with any user device (e.g., the first user device 106 or any other user device) (as shown by arrow 328). In the current embodiment, it is assumed that the transaction card 102 is currently not paired with any user device. Therefore, based on the query, the payment network server 108 determines that the transaction card 102 is currently not paired with any user device.

Consequently, the payment network server 108 generates the first pairing identifier based on the transaction card identifier and the first user-device identifier (as shown by arrow 330). In one embodiment, the first pairing identifier is a combination of the transaction card identifier and the first user-device identifier. For example, if the transaction card identifier is "FD5374" and the first user-device identifier is "FSIWF653845", the first pairing identifier is "FD5374FSIWF653845", i.e., the combination of the transaction card identifier and the first user-device identifier. In another embodiment, the first pairing identifier is a unique alphanumeric code that is generated based on the transaction card identifier and the first user-device identifier. The payment network server 108 may utilize a code generation algorithm that takes the transaction card identifier and the first user-device identifier as inputs and outputs the unique alphanumeric code as the first pairing identifier. The first pairing identifier uniquely identifies the pairing between the transaction card 102 and the first user device 106.

The payment network server 108 then pairs the first user device 106 with the transaction card 102 by way of the first pairing identifier (as shown by arrow 332). In other words, the payment network server 108 stores the first pairing identifier, which indicates the pairing of the first user device 106 with the transaction card 102, in the first database. The payment network server 108 then communicates the first pairing identifier to the issuer server 110 (as shown by arrow 334). The issuer server 110 stores the first pairing identifier in association with the transaction card data of the transaction card 102, in the second database of the issuer server 110 (as shown by arrow 336). In one embodiment, the second database may include a look-up table, where each row of the look-up table corresponds to a unique pairing between a transaction card and a user device. For example, a first row of the look-up table may correspond to the pairing of the transaction card 102 with the first user device 106 and may include the first pairing identifier. The first row may further include the transaction card data of the transaction card 102 (i.e., the first pairing identifier is mapped to the transaction card data of the first transaction card).

The payment network server 108 further communicates a first notification to the first user device 106, indicating the successful pairing of the first user device 106 and the transaction card 102 (as shown by arrow 338). The service application 114 presents the first notification on the UI, indicating that the first user device 106 and the transaction card 102 are successfully paired (as shown by arrow 340).

In another embodiment, in the interest of data security, the service application 114 may further prompt the user 104 to answer a set of security questions when the user 104 initiates the first pairing request. For example, the service application 114 may prompt the user 104 to provide a personal identification number (PIN) associated with the transaction card 102. Each answer provided by the user 104 may be validated by the payment network server 108 and/or the issuer server 110, prior to the pairing of the transaction card 102 and the first user device 106. In such as a scenario, pairing of the transaction card 102 and the first user device 106 may be predicated on a successful validation of each answer provided by the user 104.

In another embodiment, the payment network server 108 may allow the user 104 to pair the transaction card 102 with more than one user device. A count of user devices that are allowed to be paired with the transaction card 102 may be pre-determined by the payment network server 108 and/or the issuer server 110. Before the allowable device count is reached, the transaction card 102 may be paired with one or more other user devices in a similar manner as described above.

Figure 4A:
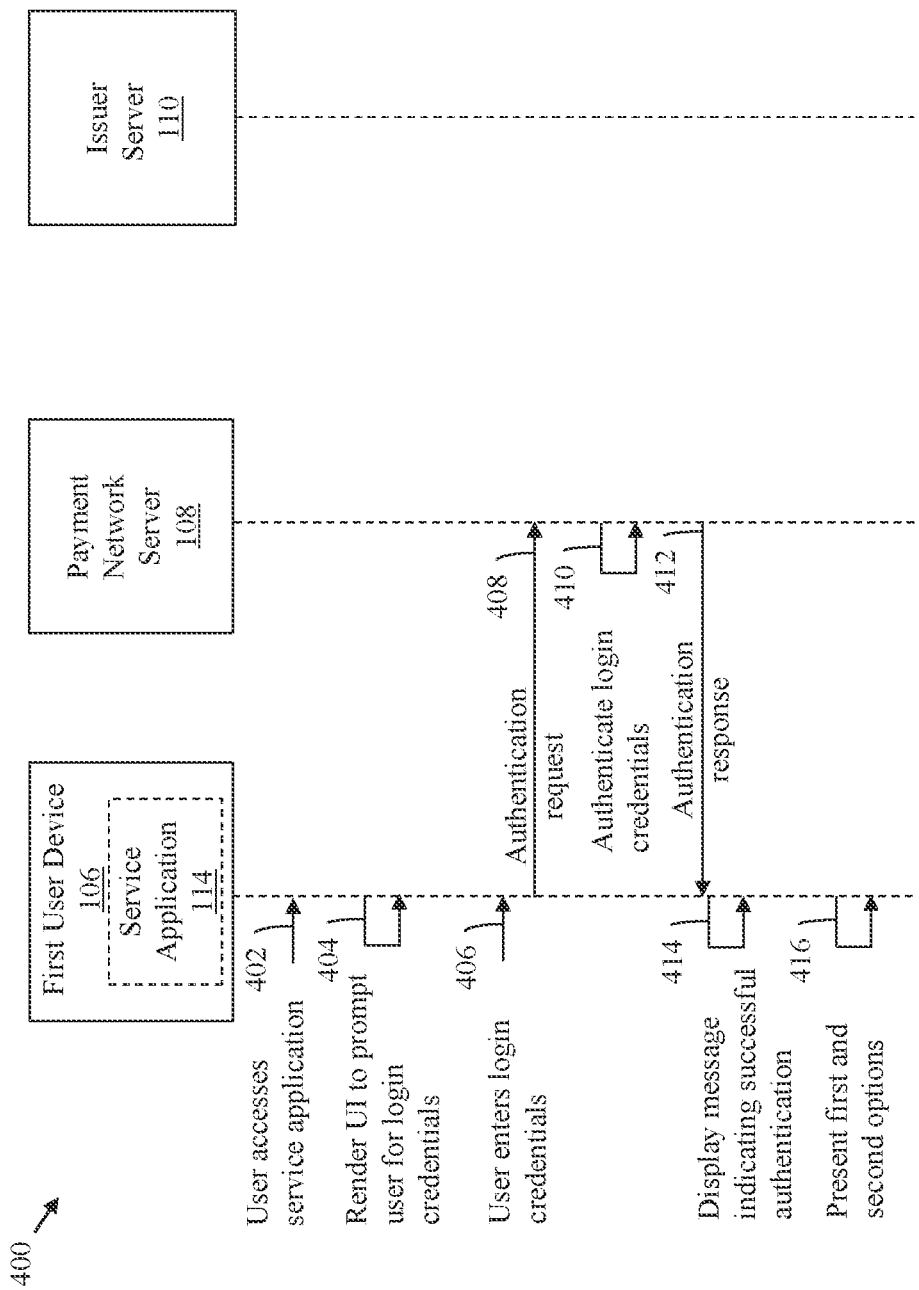
Figure 4C:
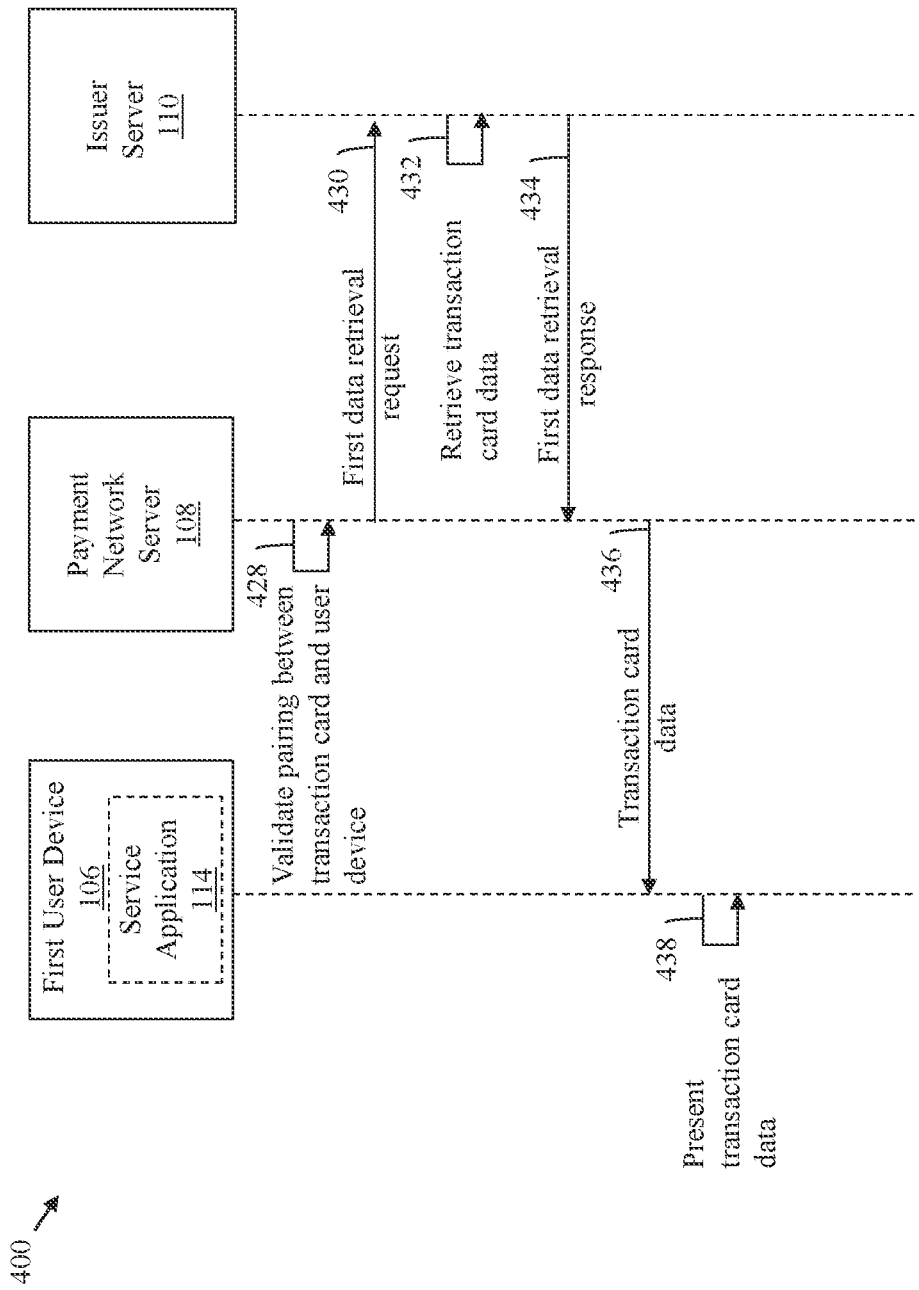

FIGS. 4A-4C, collectively represent a process flow diagram 400 that illustrates a process for securely presenting the transaction card data of the transaction card 102 on the paired first user device 106, in accordance with an exemplary embodiment of the present disclosure. FIGS. 4A-4C are explained in conjunction with FIGS. 3A-3C.

With reference to FIG. 4A, the user 104 accesses the service application 114 on the first user device 106 (as shown by arrow 402). The service application 114 renders the UI on the first display and prompts the user 104 to provide the login credentials of the user 104 (as shown by arrow 404). The user 104 enters the login credentials (e.g., the username and the password) through the UI of the service application 114 (as shown by arrow 406). Based on the login credentials entered by the user 104, the first user device 106 communicates an authentication request to the payment network server 108 for authentication (as shown by arrow 408). The authentication request includes the entered login credentials. The payment network server 108 authenticates or validates the entered login credentials (as shown by arrow 410). Based on the authentication, the payment network server 108 communicates an authentication response to the first user device 106 (as shown by arrow 412). Based on the authentication response, the user 104 is logged into the service application 114. Further, based on the authentication response, the service application 114 displays a message indicating that the user 104 is successfully authenticated (as shown by arrow 414). The service application 114 presents, on the UI, the first and second options for selection by the user 104 (as shown by arrow 416). In the current embodiment, it is assumed that the transaction card 102 is already paired with the first user device 106.

With reference to FIG. 4B, the user 104 selects the second option to initiate the first data presentation request for securely viewing the transaction card data on the first user device 106 (as shown by arrow 418). Based on the selection of the second option, the service application 114 prompts the user 104 to tap the transaction card 102 on the first user device 106 (as shown by arrow 420). The user 104 taps the transaction card 102 on the first user device 106 (as shown by arrow 422). When the transaction card 102 is tapped on the first user device 106, the transaction card 102 and the first user device 106 interact by way of NFC. The first user device 106 acquires the transaction card identifier from the transaction card 102 by way of the NFC interaction between the first user device 106 and the transaction card 102 (as shown by arrow 424). Consequently, the first user device 106 communicates the first data presentation request to the payment network server 108 for presenting the transaction card data (as shown by arrow 426). The first data presentation request includes the transaction card identifier and the first user-device identifier.

With reference to FIG. 4C, based on the first data presentation request, the payment network server 108 using the first pairing identifier queries the first database to determine whether the transaction card 102 is paired with the first user device 106. In other words, in response to the first data presentation request, the payment network server 108 validates the pairing between the first user device 106 and the transaction card 102 based on the first pairing identifier (as shown by arrow 428). For example, the payment network server 108 may generate a pairing identifier based on the transaction card identifier and the first user-device identifier in the data presentation request. The payment network server 108 then determines whether the generated pairing identifier matches any pairing identifier stored in the first database. In a scenario, when no match is obtained for the generated pairing identifier, the payment network server 108 establishes that the transaction card 102 is not paired with the first user device 106 from which the data presentation request is received. If the payment network server 108 fails to validate the pairing, the payment network server 108 communicates an error notification to the first user device 106. However, in the current embodiment, the transaction card 102 is already paired with the first user device 106. Thus, the payment network server 108 obtains a match for the generated pairing identifier in the first database and establishes that the validation of the pairing between the transaction card 102 and the first user device 106 is successful.

Based on successful validation, the payment network server 108 communicates a first data retrieval request to the issuer server 110 for retrieving the transaction card data (as shown by arrow 430). The first data retrieval request includes the first pairing identifier. On receiving the first data retrieval request, the issuer server 110 retrieves the transaction card data associated with the first pairing identifier from the second database (as shown by arrow 432). The issuer server 110 communicates a first data retrieval response to the payment network server 108 (as shown by arrow 434). The first data retrieval response includes the transaction card data of the transaction card 102. Thus, the payment network server 108 retrieves the transaction card data from the issuer server 110 and communicates the transaction card data to the first user device 106 (as shown by arrow 436). In the interest of preserving data security, the transaction card data communicated to the first user device 106 may be in an encrypted format. The service application 114 may decrypt the encrypted transaction card data and present the transaction card data to the user 104 on the UI rendered on the first user device 106 (as shown by arrow 438). Thus, the user 104 views the transaction card data that is securely presented on the first user device 106. For ensuring data security, the transaction card data is only temporarily presented on the UI and is denied storage on the service application 114 or the first user device 106.

In another embodiment, the service application 114 may prompt the user 104 to answer one or more security questions when the user 104 initiates the first data presentation request. For example, the service application 114 may prompt the user 104 to provide the PIN associated with the transaction card 102. Each answer provided by the user 104 may be validated by the payment network server 108 and/or the issuer server 110, prior to the communication of the first data retrieval request. The transaction card data may not be communicated to the first user device 106 unless each answer provided by the user 104 is successfully validated.

In another embodiment, when multiple user devices are paired with the transaction card 102, the payment network server 108 allows the presentation of the transaction card data on only one user device at a time. Thus, while the transaction card data of the transaction card 102 is being presented on the paired first user device 106, data presentation requests from other paired user devices of the user 104 are rejected by the payment network server 108.

Figure 5C:
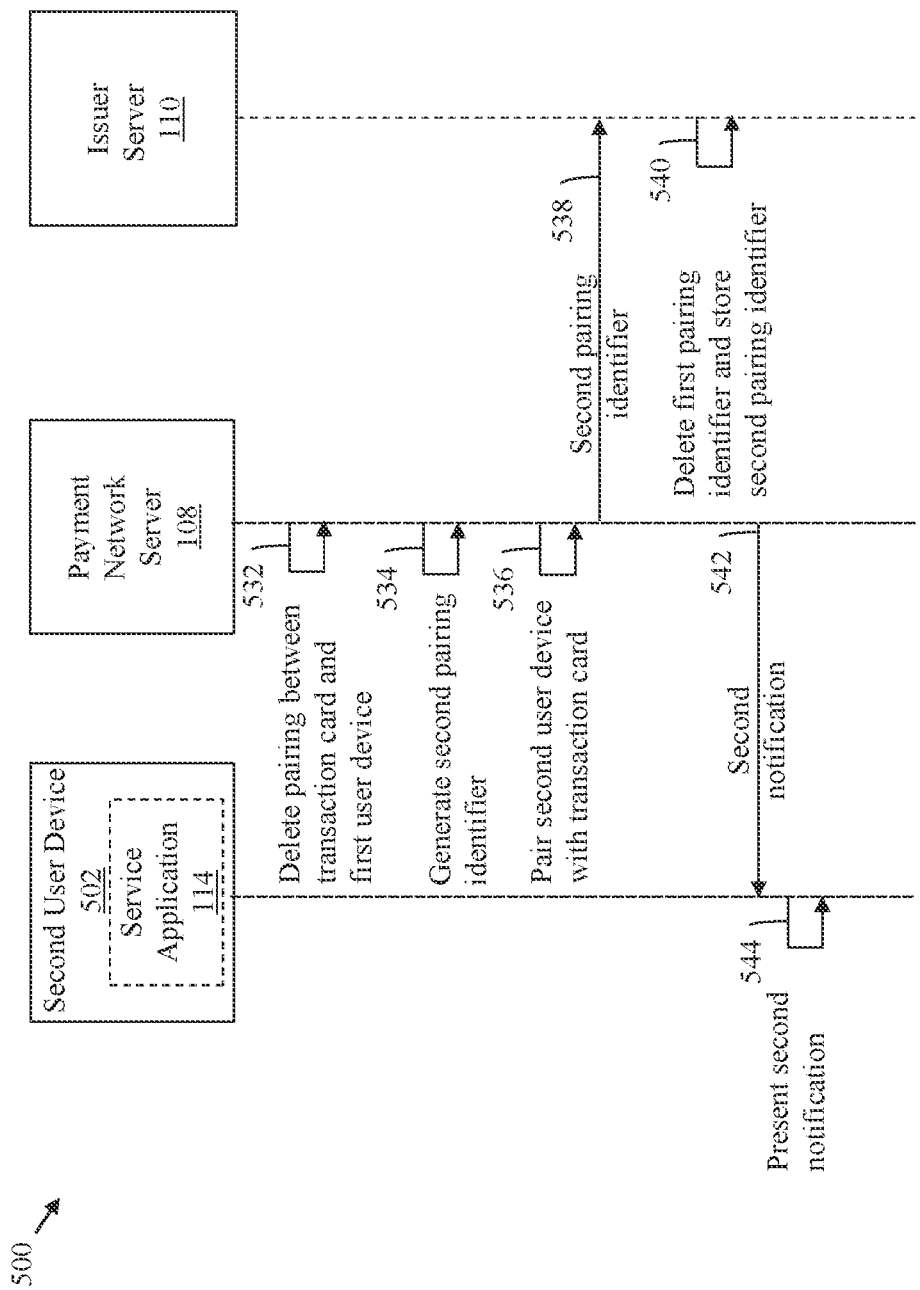

FIGS. 5A-5C, collectively represent a process flow diagram 500 that illustrates a process for pairing the transaction card 102 with another user device, in accordance with an exemplary embodiment of the present disclosure. Process flow diagram 500 illustrates a process for pairing the transaction card 102 to a second user device 502 of the user 104 when the transaction card 102 is already paired with the first user device 106. FIGS. 5A-5C describe a scenario where the service application 114 is hosted by the payment network server 108.

With reference to FIG. 5A, the user 104 accesses the service application 114 on the second user device 502 (as shown by arrow 504). The service application 114 renders the UI on a second display of the second user device 502 and prompts the user 104 to provide login credentials for logging into the service application 114 (as shown by arrow 506). The user 104 enters the login credentials (e.g., the username and the password) through the UI (as shown by arrow 508). Based on the login credentials entered by the user 104, the second user device 502 communicates an authentication request to the payment network server 108 for authenticating the user 104 (as shown by arrow 510). The authentication request includes the entered login credentials. The payment network server 108 authenticates or validates the entered login credentials (as shown by arrow 512).

Based on the authentication, the payment network server 108 communicates an authentication response to the first user device 106 (as shown by arrow 514). Based on the authentication response, the user 104 is logged into the service application 114. Further, based on the authentication response, the service application 114 displays a message indicating that the user 104 is successfully authenticated (as shown by arrow 516). The service application 114 presents, on the UI, the first and second options for selection by the user 104 (as shown by arrow 518).

The transaction card 102 is currently paired with the first user device 106 and the user 104 intends to pair the transaction card 102 with the second user device 502. In the current embodiment, it is assumed that a transaction card (e.g., the transaction card 102) may be paired only with a single user device at any instance of time, i.e., the count of devices that can be paired with the transaction card 102 is one. Therefore, the pairing between the first user device 106 and the transaction card 102 may need to be deleted before the second user device 502 is paired with the transaction card 102. However, it will be apparent to a person skilled in the art that in other embodiments, the transaction card 102 may be paired with multiple user devices as described in the foregoing description of FIGS. 3A-3C.

With reference to FIG. 5B, the user 104 selects the first option to initiate a second pairing request for pairing the second user device 502 with the transaction card 102 (as shown by arrow 520). Based on the selection of the first option, the service application 114 prompts the user 104 to tap the transaction card 102 on the second user device 502 (as shown by arrow 522). For the sake of brevity, it is assumed that the second user device 502 is similar to the first user device 106 (i.e., the second user device 502 supports NFC interaction). The user 104 taps the transaction card 102 on the second user device 502 (as shown by arrow 524). When the transaction card 102 is tapped on the second user device 502, the transaction card 102 and the second user device 502 interact by way of NFC. The second user device 502 (i.e., the service application 114) acquires the transaction card identifier of the transaction card 102 by way of the NFC interaction (as shown by arrow 526). Consequently, the second user device 502 communicates a second pairing request to the payment network server 108 for pairing the second user device 502 with the transaction card 102 (as shown by arrow 528). The second pairing request includes the transaction card identifier and a second user-device identifier of the second user device 502.

Based on the transaction card identifier, the payment network server 108 queries the first database to determine whether the transaction card 102 is currently paired with any user device (as shown by arrow 530). Based on the query, the payment network server 108 determines that the transaction card 102 is currently paired with the first user device 106 and the allowable count of devices that can be paired with the transaction card 102 is one.

With reference to FIG. 5C, based on the second pairing request, the payment network server 108 deletes the pairing between the first user device 106 and the transaction card 102 (as shown by arrow 532). In some embodiments, the payment network server 108 communicates a request to the second user device 502 for acquiring a consent of the user 104 prior to the deletion of the pairing between the first user device 106 and the transaction card 102. Based on the consent of the user 104, the payment network server 108 may delete the pairing between the first user device 106 and the transaction card 102. The payment network server 108 generates a second pairing identifier based on the transaction card identifier and the first user-device identifier (as shown by arrow 534). The payment network server 108 generates the second pairing identifier in a similar manner as described in the foregoing description of FIG. 3A-3C.

The payment network server 108 pairs the second user device 502 with the transaction card 102 by way of the second pairing identifier (as shown by arrow 536). In other words, the payment network server 108 stores the second pairing identifier, which indicates the pairing of the second user device 502 with the transaction card 102, in the first database. The payment network server 108 then communicates the second pairing identifier to the issuer server 110 (as shown by arrow 538). The issuer server 110 deletes the first pairing identifier from the second database and stores the second pairing identifier in association with the transaction card data of the transaction card 102 in the second database (as shown by arrow 540). The payment network server 108 further communicates a second notification to the first user device 106, indicating the successful pairing of the second user device 502 and the transaction card 102 (as shown by arrow 542). The second notification further indicates the deletion of the pairing between the first user device 106 and the transaction card 102. The service application 114 presents the second notification on the UI, indicating that the second user device 502 and the transaction card 102 are successfully paired (as shown by arrow 544).

Figure 6A:
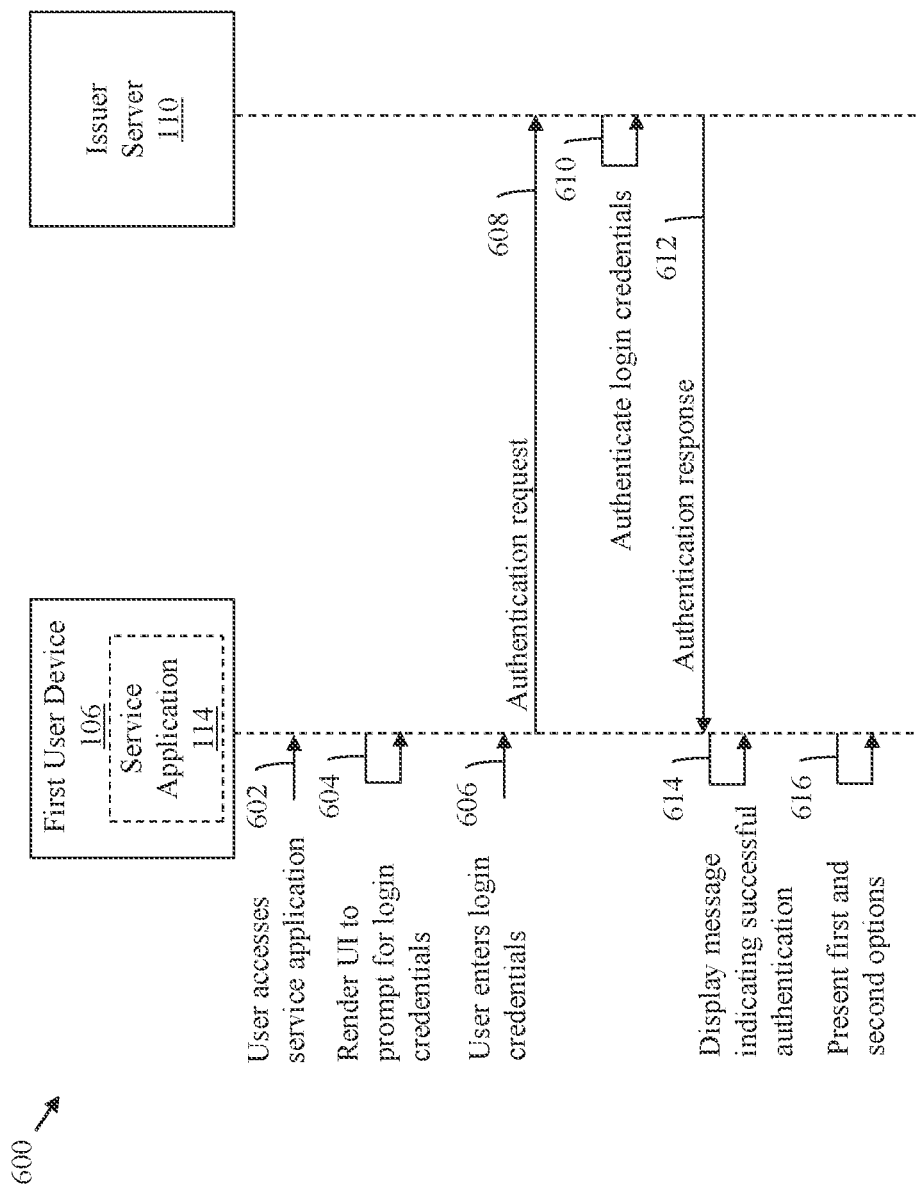
FIGS. 6A-6C, collectively represent a process flow diagram that illustrates a process for pairing the transaction card with the user device, in accordance with another exemplary embodiment of the present disclosure.
Figure 6B:
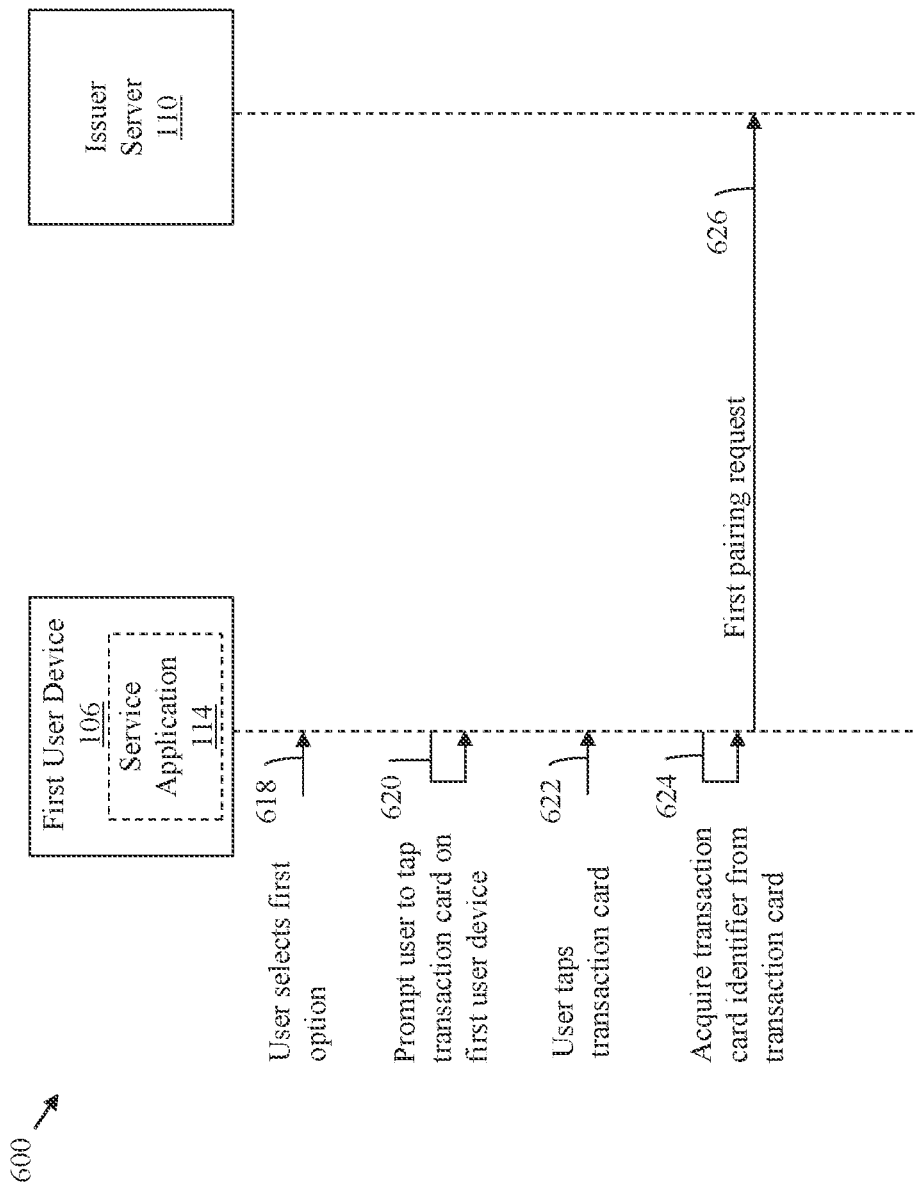
Figure 6C:
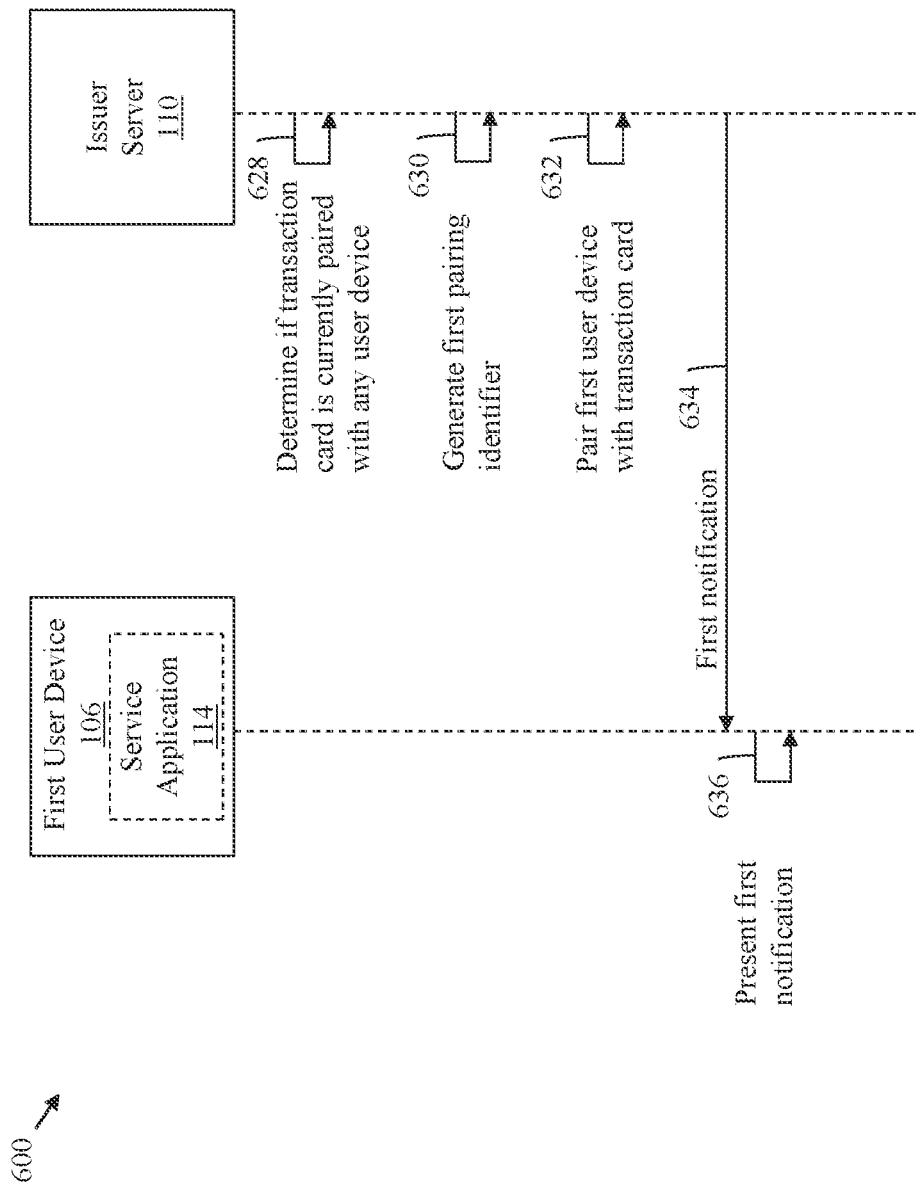

FIGS. 6A-6C, collectively represent a process flow diagram 600 that illustrates a process for pairing the transaction card 102 with the first user device 106, in accordance with another exemplary embodiment of the present disclosure. The process flow diagram 600 describes a scenario where the service application 114 is hosted by the issuer server 110. In such a scenario, the payment network server 108 may not be involved in the pairing of the first user device 106 with the transaction card 102.

With reference to FIG. 6A, the user 104 accesses the service application 114 on the first user device 106 (as shown by arrow 602). The service application 114 renders the UI on the first display of the first user device 106 and prompts the user 104 to provide the login credentials (as shown by arrow 604). The user 104 enters the login credentials through the UI (as shown by arrow 606). Based on the login credentials entered by the user 104, the first user device 106 communicates an authentication request to the issuer server 110 for authenticating the user 104 (as shown by arrow 608). The authentication request includes the entered login credentials. The issuer server 110 authenticates or validates the entered login credentials (as shown by arrow 610). Based on the authentication, the issuer server 110 communicates an authentication response to the first user device 106 (as shown by arrow 612). The authentication response indicates whether the authentication is successful. Based on the authentication response, the user 104 is logged into the service application 114. Further, based on the authentication response, the service application 114 displays a message indicating that the user 104 is successfully authenticated (as shown by arrow 614). The service application 114 presents, on the UI, the first and second options for selection by the user 104 (as shown by arrow 616). In the current embodiment, it is assumed that the transaction card 102 is currently not paired with any user device and that the user 104 intends to pair the transaction card 102 with the first user device 106.

With reference to FIG. 6B, the user 104 selects the first option to initiate the first pairing request for pairing the first user device 106 with the transaction card 102 (as shown by arrow 618). Based on the selection of the first option, the service application 114 prompts the user 104 to tap the transaction card 102 on the first user device 106 (as shown by arrow 620). The user 104 taps the transaction card 102 on the first user device 106 (as shown by arrow 622). When the transaction card 102 is tapped on the first user device 106, the transaction card 102 and the first user device 106 interact by way of NFC. The first user device 106 (i.e., the service application 114) acquires the transaction card identifier of the transaction card 102 by way of the NFC interaction between the first user device 106 and the transaction card 102 (as shown by arrow 624). Consequently, the first user device 106 communicates the first pairing request to the issuer server 110 for pairing the first user device 106 with the transaction card 102 (as shown by arrow 626). The first pairing request is indicative of the transaction card identifier and the first user-device identifier.

With reference to FIG. 6C, based on the transaction card identifier and/or the first user-device identifier, the issuer server 110 queries the second database to determine whether the transaction card 102 is currently paired with any user device (e.g., the first user device 106 or the second user device 502) (as shown by arrow 628). In the current embodiment, it is assumed that the transaction card 102 is currently not paired with any user device. Therefore, based on the query, the issuer server 110 determines that the transaction card 102 is currently not paired with any user device. Consequently, the issuer server 110 generates the first pairing identifier based on the transaction card identifier and the first user-device identifier (as shown by arrow 630).

The issuer server 110 then pairs the first user device 106 with the transaction card 102 by way of the first pairing identifier (as shown by arrow 632). In other words, the issuer server 110 stores the first pairing identifier, which indicates the pairing of the first user device 106 with the transaction card 102, in association with the first pairing identifier, in the second database. The issuer server 110 then communicates a first notification to the first user device 106, indicating the successful pairing of the first user device 106 with the transaction card 102 (as shown by arrow 634). The service application 114 presents the first notification to the user 104 on the UI, indicating that the first user device 106 and the transaction card 102 are successfully paired (as shown by arrow 636).

Figure 7A:
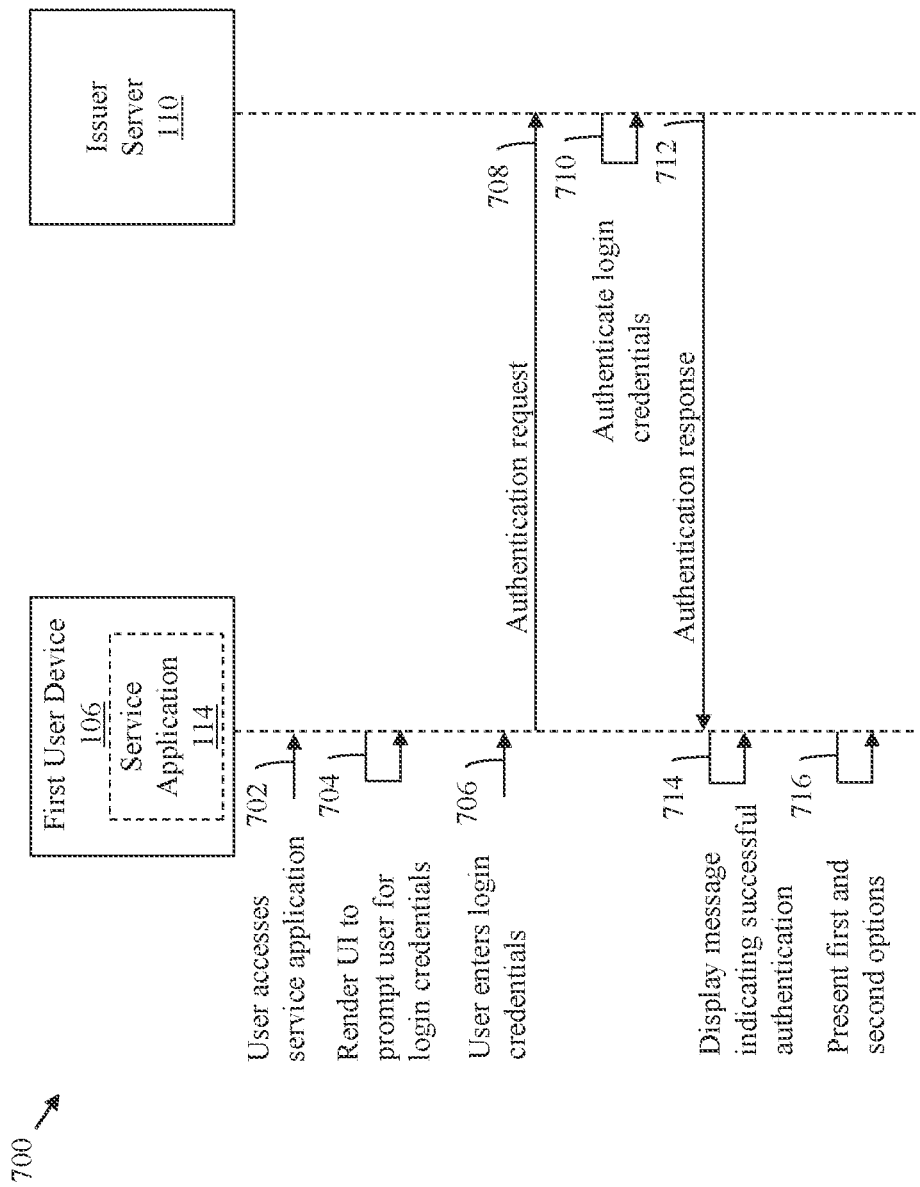
Figure 7C:
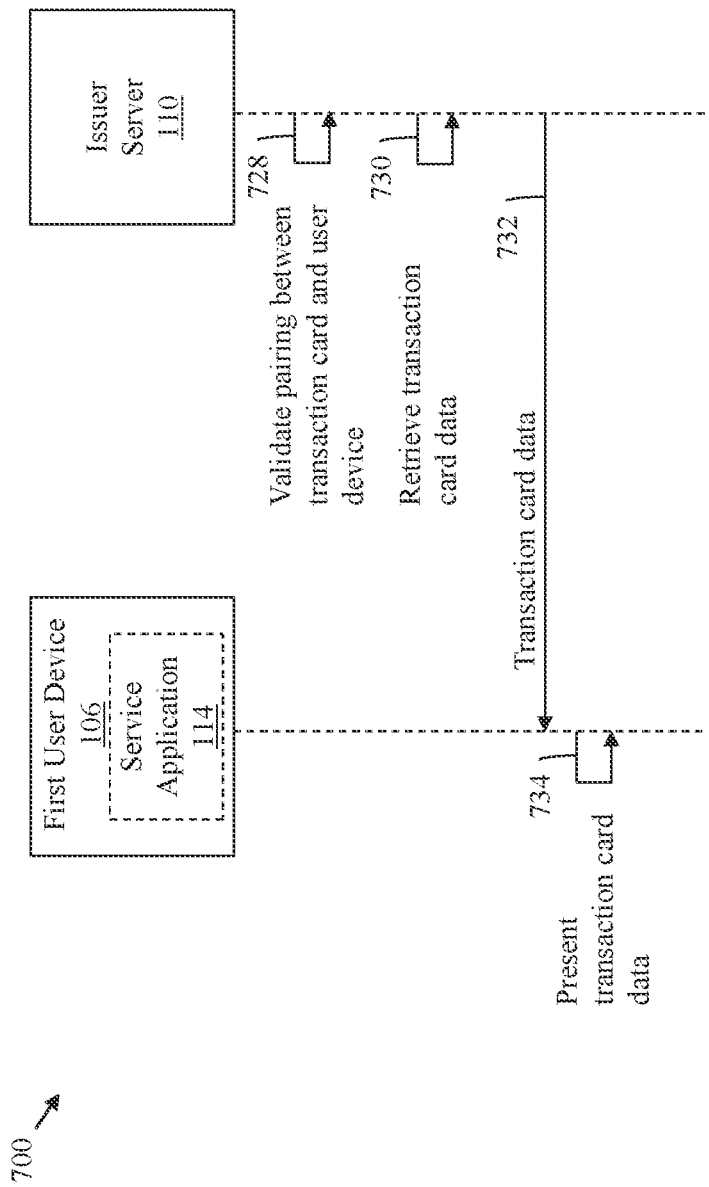

FIGS. 7A-7C, collectively represent a process flow diagram 700 that illustrates a process for securely presenting the transaction card data of the transaction card 102 on the paired first user device 106, in accordance with another exemplary embodiment of the present disclosure. FIGS. 7A-7C are explained in conjunction with FIGS. 6A-6C.

With reference to FIG. 7A, the user 104 accesses the service application 114 on the first user device 106 (as shown by arrow 702). The service application 114 renders the UI on the first display and prompts the user 104 to provide the login credentials of the user 104 (as shown by arrow 704). The user 104 enters the login credentials through the UI of the service application 114 (as shown by arrow 706). Based on the login credentials entered by the user 104, the first user device 106 communicates an authentication request to the issuer server 110 for authentication of the user 104 (as shown by arrow 708). The authentication request includes the entered login credentials. The issuer server 110 authenticates or validates the entered login credentials (as shown by arrow 710). Based on the authentication, the issuer server 110 communicates an authentication response to the first user device 106 (as shown by arrow 712). Based on the authentication response, the user 104 is logged into the service application 114. Further, based on the authentication response, the service application 114 displays a message indicating that the user 104 is successfully authenticated (as shown by arrow 714). The service application 114 presents the first and second options on the UI for selection by the user 104 (as shown by arrow 716). In the current embodiment, it is assumed that the transaction card 102 is currently paired with the first user device 106.

With reference to FIG. 7B, the user 104 selects the second option to initiate the first data presentation request for securely viewing the transaction card data on the first user device 106 (as shown by arrow 718). Based on the selection of the second option, the service application 114 prompts the user 104 to tap the transaction card 102 on the first user device 106 (as shown by arrow 720). The user 104 taps the transaction card 102 on the first user device 106 (as shown by arrow 722). When the transaction card 102 is tapped on the first user device 106, the transaction card 102 and the first user device 106 interact by way of NFC. Thus, the first user device 106 acquires the transaction card identifier by way of the NFC interaction between the first user device 106 and the transaction card 102 (as shown by arrow 724). Consequently, the first user device 106 communicates the first data presentation request to the issuer server 110 for presenting the transaction card data (as shown by arrow 726). The first data presentation request includes the transaction card identifier and the first user-device identifier.

With reference to FIG. 7C, based on the first data presentation request, the issuer server 110 queries the second database using the first pairing identifier to determine whether the transaction card 102 is paired with the first user device 106. In other words, the issuer server 110 validates the pairing between the transaction card 102 and the first user device 106, based on the first pairing identifier (as shown by arrow 728).

If the issuer server 110 fails to validate the pairing, the issuer server 110 communicates an error notification to the first user device 106. However, in the current embodiment, the transaction card 102 is paired with the first user device 106. Therefore, the issuer server 110 validates the pairing between the transaction card 102 and the first user device 106, in response to the first data presentation request. Based on the validation, the issuer server 110 retrieves, from the second database, the transaction card data corresponding to the first pairing identifier (as shown by arrow 730). On retrieval of the transaction card data, the issuer server 110 communicates the transaction card data to the first user device 106 (as shown by arrow 732). The service application 114 presents the transaction card data to the user 104 on the UI rendered on the first user device 106 for viewing by the user 104 (as shown by arrow 734). Thus, the user 104 views the transaction card data that is securely presented on the first user device 106. For ensuring data security, the transaction card data is only temporarily presented on the UI and is denied storage on the service application 114 or the first user device 106.

Figure 8A:
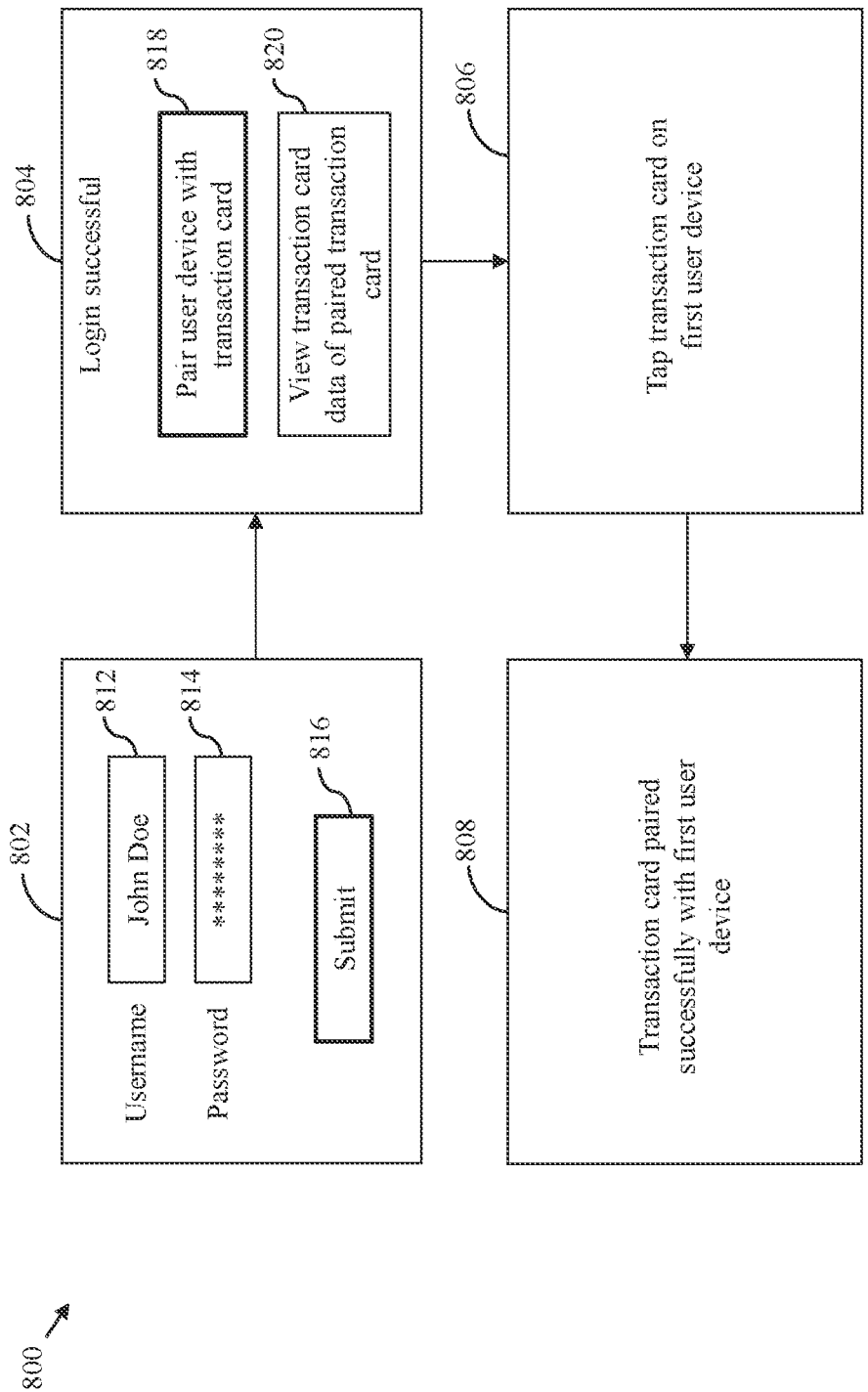
FIGS. 8A and 8B, collectively represent an exemplary scenario that illustrates user interface screens rendered on the user device for securely presenting the transaction card data, in accordance with an exemplary embodiment of the present disclosure.
Figure 8B:
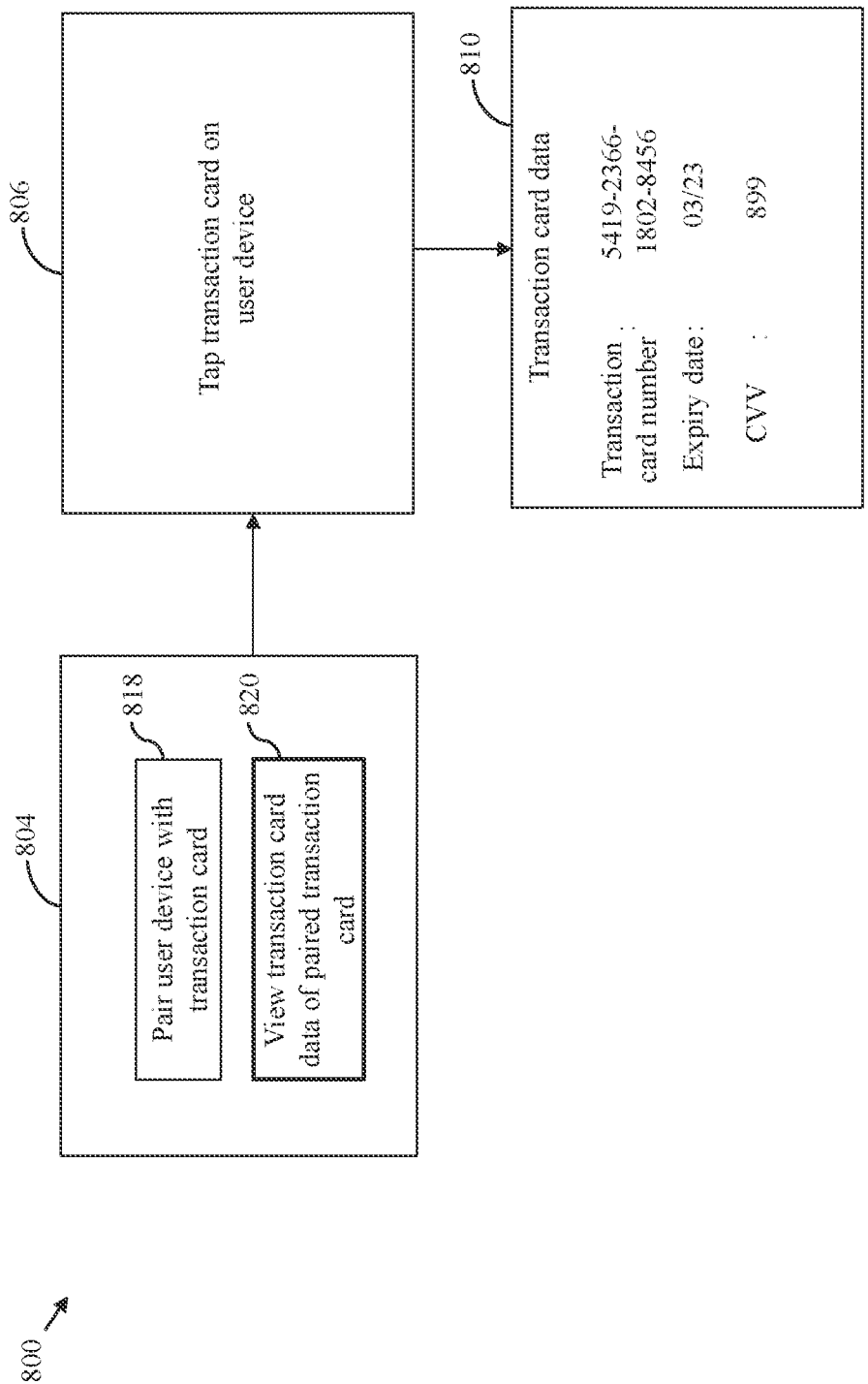

FIGS. 8A and 8B, collectively represent an exemplary scenario 800 that illustrates UI screens 802-810 rendered on the first user device 106 for securely presenting the transaction card data, in accordance with an exemplary embodiment of the present disclosure. FIGS. 8A and 8B are explained in conjunction with FIGS. 3A-3C and FIGS. 4A-4C. The UI screens 802-810 are rendered by the payment network server 108 on the first user device 106 by way of the service application 114 installed or executed on the first user device 106.

When the user 104 accesses the service application 114 on the first user device 106, the service application 114 renders the UI screen 802. The UI screen 802 prompts the user 104 to enter the username and the password (i.e., the login credentials) to log into the service application 114. The user 104 enters the username and the password in first and second text boxes 812 and 814, respectively. After entering the username and the password, the user 104 selects a first submit button 816 for logging into the service application 114. The first user device 106 communicates the authentication request to the payment network server 108 for authentication. The payment network server 108 authenticates the user 104 and communicates the authentication response to the first user device 106. If the authentication response is indicative of successful authentication of the user 104, control is redirected to the UI screen 804.

The UI screen 804 presents first and second user-selectable options 818 and 820 (i.e., the first and second options) to the user 104 for selection. The first user-selectable option 818 allows the user 104 to initiate a pairing request for pairing a transaction card (e.g., the transaction card 102) with the first user device 106. The second user-selectable option 820 allows the user 104 to view transaction card data of any transaction card (e.g., the transaction card data of the transaction card 102) that is paired with the first user device 106. For pairing the first user device 106 with the transaction card 102, the user 104 selects the first user-selectable option 818 to initiate the first pairing request. Control is redirected to UI screen 806.

The UI screen 806 presents a message, prompting the user 104 to tap the transaction card 102 on the first user device 106. Consequently, the user 104 taps the transaction card 102 on the first user device 106. Following the tapping of the transaction card 102 on the first user device 106, the first user device 106 communicates the first pairing request to the payment network server 108. The payment network server 108 pairs the transaction card 102 with the first user device 106 and communicates the first notification to the first user device 106. On reception of the first notification, control is redirected to UI screen 808. The UI screen 808 presents the first notification to the user 104. The first notification indicates that the first user device 106 is successfully paired with the transaction card 102.

When the user 104 intends to view the transaction card data of the transaction card 102 on the first user device 106, the user 104 selects the second user-selectable option 820, presented on the UI screen 804. Control is redirected to the UI screen 806. The UI screen 806 presents a message to the user 104, prompting the user 104 to tap the transaction card 102 on the first user device 106. Consequently, the user 104 taps the transaction card 102 on the first user device 106. When the user 104 taps the transaction card 102 on the first user device 106, the first user device 106 communicates the first data presentation request to the payment network server 108. In response to the first data presentation request, the payment network server 108 validates the pairing between the first user device 106 and the transaction card 102, based on the first pairing identifier.

Based on the validation of the pairing between the first user device 106 and the transaction card 102, the payment network server 108 communicates the transaction card data of the transaction card 102 to the first user device 106. Control is redirected to the UI screen 810. The UI screen 810 presents the transaction card data to the user 104. In a non-limiting example, the UI screen presents the transaction card number (e.g., "5419-2302-1802-8456"), the expiry date (e.g., "03/23" or Mar. 3, 2023), and the CVV (e.g., "899").

Figure 9:
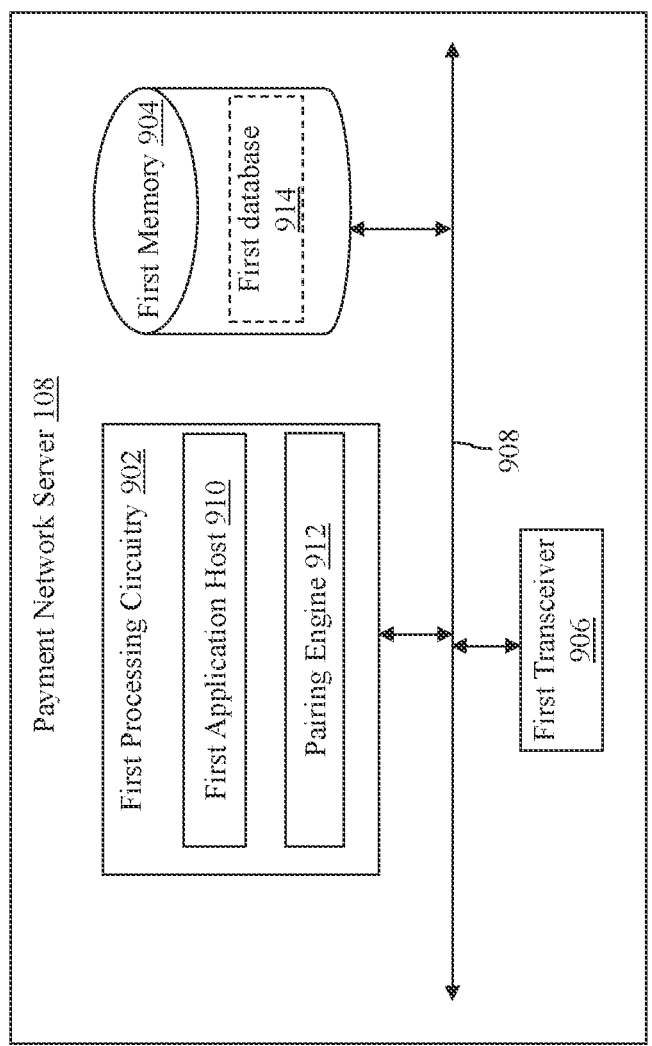
FIG. 9 is a block diagram that illustrates a payment network server of FIG. 1, in accordance with an exemplary embodiment of the present disclosure.

FIG. 9 is a block diagram that illustrates the payment network server 108, in accordance with an exemplary embodiment of the present disclosure. FIG. 9 is explained in conjunction with FIGS. 3A-3C, 4A-4C, and 5A-5C. The payment network server 108 includes first processing circuitry 902, the first memory (hereinafter, referred to as "the first memory 904"), and a first transceiver 906. The first processing circuitry 902, the first memory 904, and the first transceiver 906 may communicate with each other by way of a first communication bus 908. The first processing circuitry 902 may include a first application host 910 and a pairing engine 912.

The first processing circuitry 902 includes suitable logic, circuitry, interfaces, and/or code, executed by the circuitry, to facilitate secure presentation of the transaction card data on the first user device 106. The first processing circuitry 902 is configured to receive pairing and data presentation requests (e.g., the first pairing and data presentation requests) from the first user device 106. Based on the received pairing and data presentation requests, the first processing circuitry 902 pairs the first user device 106 with the transaction card 102 and communicates the transaction card data to the first user device 106, respectively. Examples of the first processing circuitry 902 may include, but are not limited to, an application-specific integrated circuit (ASIC) processor, a reduced instruction set computer (RISC) processor, a complex instruction set computer (CISC) processor, or a field programmable gate array (FPGA). The first processing circuitry 902 may execute various operations for facilitating viewing of the transaction card data on the first user device 106 by way of the first application host 910 and the pairing engine 912.

The first memory 904 includes suitable logic, circuitry, and/or interfaces to store various instructions or code that when executed by the first processing circuitry 902 cause the first processing circuitry 902 to perform operations for presenting the transaction card data on the first user device 106 securely. The first memory 904 is configured to store therein the first database (hereinafter, referred to as 'the first database 914') that includes pairing identifiers (e.g., the first pairing identifier) indicative of pairing between various transaction cards and user devices. Examples of the first memory 904 may include a random-access memory (RAM), a read-only memory (ROM), a removable storage drive, a hard disk drive (HDD), a flash memory, a solid-state memory, or the like. It will be apparent to a person skilled in the art that the scope of the disclosure is not limited to realizing the first memory 904 in the payment network server 108, as described herein. In another embodiment, the first memory 904 may be realized in form of a database server or a cloud storage working in conjunction with the payment network server 108, without departing from the scope of the disclosure.

The first application host 910 hosts the service application 114 that facilitates the rendering of the UI screens 802-810 on the first user device 106. The first application host 910 receives, from the first user device 106, the first pairing and data presentation requests. The first application host 910 communicates, to the first user device 106, the first notification based on the first pairing request and the transaction card data based on the first data presentation request.

The pairing engine 912 pairs the first user device 106 with the transaction card 102, based on the first pairing request. The pairing engine 912 generates and stores the first pairing identifier in the first database 914 to indicate the pairing between the first user device 106 and the transaction card 102. When the pairing engine 912 receives a pairing request (e.g., the second pairing request) to pair the transaction card 102 with another user device (e.g., the second user device 502), the pairing engine 912 deletes the existing pairing between the first user device 106 with the transaction card 102 upon receiving the consent of the user 104. The pairing engine 912 deletes the first pairing identifier from the first database 914 and stores the second pairing identifier in the first database 914 to indicate pairing between the transaction card 102 and the second user device 502.

The first transceiver 906 includes suitable logic, circuitry, interfaces, and/or code, executable by the circuitry, to transmit and receive data over the communication network 112 using one or more communication network protocols. The first transceiver 906 transmits requests and messages to and receives requests and messages from the first user device 106, the second user device 502, and the issuer server 110. Examples of the first transceiver 906 may include, but are not limited to, an antenna, a radio frequency transceiver, a wireless transceiver, a Bluetooth transceiver, an ethernet port, a universal serial bus (USB) port, or any other device configured to transmit and receive data.

Figure 10:
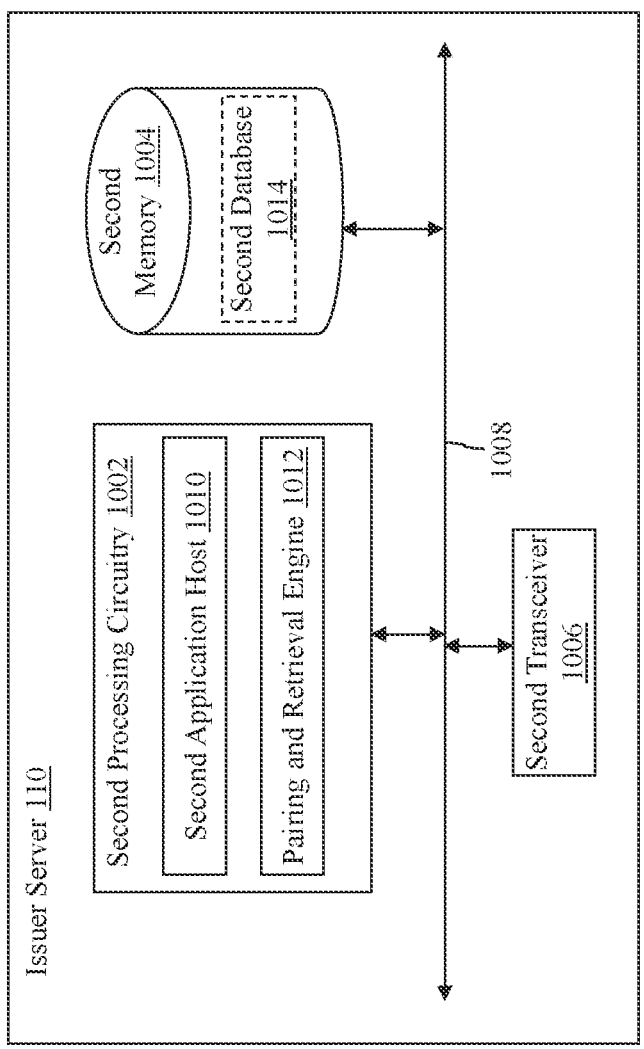
FIG. 10 is a block diagram that illustrates an issuer server of FIG. 1, in accordance with an exemplary embodiment of the present disclosure.

FIG. 10 is a block diagram that illustrates the issuer server 110, in accordance with an exemplary embodiment of the present disclosure. FIG. 10 is explained in conjunction with FIGS. 3A-3C, 4A-4C, 5A-5C, and 6A-6C. The issuer server 110 includes second processing circuitry 1002, the second memory (hereinafter, referred to as "the second memory 1004"), and a second transceiver 1006. The second processing circuitry 1002, the second memory 1004, and the second transceiver 1006 may communicate with each other by way of a second communication bus 1008. The second processing circuitry 1002 includes a second application host 1010 and a pairing and retrieval engine 1012.

The second processing circuitry 1002 includes suitable logic, circuitry, interfaces, and/or code, executed by the circuitry, to store pairing identifiers (e.g., the first and second pairing identifiers) and retrieve corresponding transaction card data. The second processing circuitry 1002 is configured to generate the pairing identifiers or receive the pairing identifiers from the payment network server 108, and communicate the transaction card data to the payment network server 108. Examples of the second processing circuitry 1002 may include, but are not limited to, an ASIC processor, a RISC processor, a CISC processor, or an FPGA. The second processing circuitry 1002 executes various operations for hosting the service application 114, generating pairing identifiers, storing the pairing identifiers, and communicating the transaction card data by way of the second application host 1010 and the pairing and retrieval engine 1012.

The second memory 1004 includes suitable logic, circuitry, and/or interfaces to store various instructions or code that when executed by the second processing circuitry 1002 cause the second processing circuitry 1002 to perform operations for presenting the transaction card data on the first user device 106 securely. The is configured to store the transaction card data and the pairing identifiers (e.g., the first pairing identifier or the second pairing identifier) in the second database (hereinafter, referred to as 'the second database 1014'). Examples of the second memory 1004 may include a RAM, a ROM, a removable storage drive, an HDD, a flash memory, a solid-state memory, and the like. It will be apparent to a person skilled in the art that the scope of the disclosure is not limited to realizing the second memory 1004 in the issuer server 110, as described herein. In another embodiment, the second memory 1004 may be realized in form of a database server or a cloud storage working in conjunction with the issuer server 110, without departing from the scope of the disclosure.

The second application host 1010 hosts the service application 114 that facilitates the rendering of the UI on the first user device 106. The second application host 1010 receives, from the first user device 106, the first pairing and data presentation requests. The second application host 1010 communicates, to the first user device 106, the first notification based on the first pairing request and the transaction card data based on the first data presentation request.

The pairing and retrieval engine 1012 stores, in the second database 1014 in the second memory 1004, the pairing identifiers (e.g., the first pairing identifier or the second pairing identifier) received from the payment network server 108 or generated by the issuer server 110. The received pairing identifiers are associated with the transaction card data of the corresponding transaction card 102. Based on data retrieval requests (e.g., the first data retrieval request) received from the payment network server 108, the issuer server 110 communicates data retrieval responses (e.g., the first data retrieval response) to the payment network server 108. The data retrieval responses are indicative of the data retrieved by the pairing and retrieval engine 1012 from the second database 1014.

The second transceiver 1006 includes suitable logic, circuitry, interfaces, and/or code, executable by the circuitry, to transmit and receive data over the communication network 112 using one or more communication network protocols. The second transceiver 1006 transmits requests and messages to and receives requests and messages from the payment network server 108 and the first user device 106. Examples of the second transceiver 1006 may include, but are not limited to, an antenna, a radio frequency transceiver, a wireless transceiver, a Bluetooth transceiver, an ethernet port, a USB port, or any other device configured to transmit and receive data.

Figure 11:
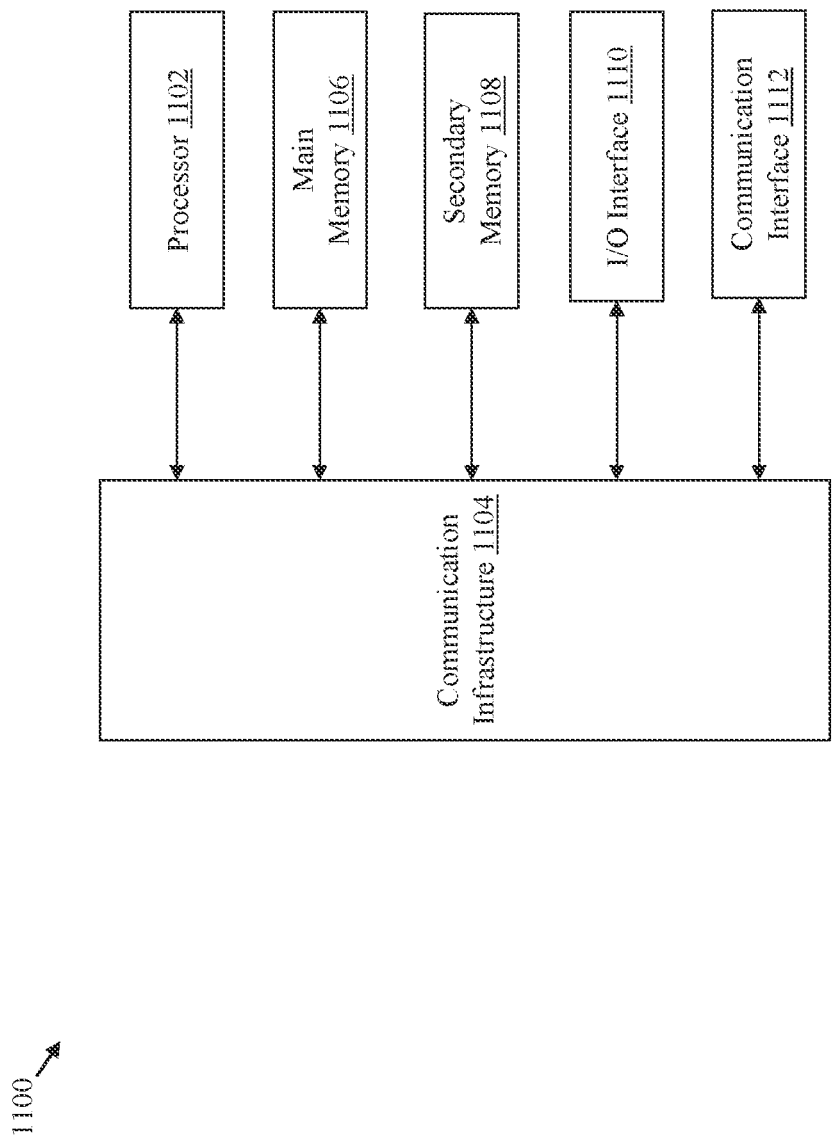
FIG. 11 is a block diagram that illustrates a system architecture of a computer system, in accordance with an exemplary embodiment of the present disclosure.

FIG. 11 is a block diagram that illustrates a system architecture of a computer system 1100, in accordance with an exemplary embodiment of the present disclosure. An embodiment of disclosure, or portions thereof, may be implemented as computer readable code on the computer system 1100. In one example, the first user device 106, the second user device 502, the payment network server 108, and the issuer server 110 may be implemented as the computer system 1100.

Hardware, software, or any combination thereof may embody modules and components used to implement methods of FIGS. 12A-12C and 13. The computer system 1100 includes a processor 1102 that may be a special-purpose or a general-purpose processing device. The processor 1102 may be a single processor, multiple processors, or combinations thereof. Further, the processor 1102 may be connected to a communication infrastructure 1104, such as a bus, message queue, multi-core message-passing scheme, and the like. The computer system 1100 may further include a main memory 1106 and a secondary memory 1108. Examples of the main memory 1106 may include a RAM, a ROM, and the like. The secondary memory 1108 may include an HDD or a removable storage drive, such as a floppy disk drive, a magnetic tape drive, a compact disc, an optical disk drive, a flash memory, and the like.

The computer system 1100 further includes an input/output (I/O) interface 1110 and a communication interface 1112. The I/O interface 1110 includes various input and output devices that are configured to communicate with the processor 1102. Examples of the input devices may include a keyboard, a mouse, a joystick, a touchscreen, a microphone, and the like. Examples of the output devices may include a display screen, a speaker, headphones, and the like. The communication interface 1112 may be configured to allow data to be transferred between the computer system 1100 and various devices that are communicatively coupled to the computer system 1100. Examples of the communication interface 1112 may include a modem, a network interface, i.e., an Ethernet card, a communication port, and the like. Data transferred via the communication interface 1112 may correspond to signals, such as electronic, electromagnetic, optical, or other signals as will be apparent to a person skilled in the art.

Figure 12A:
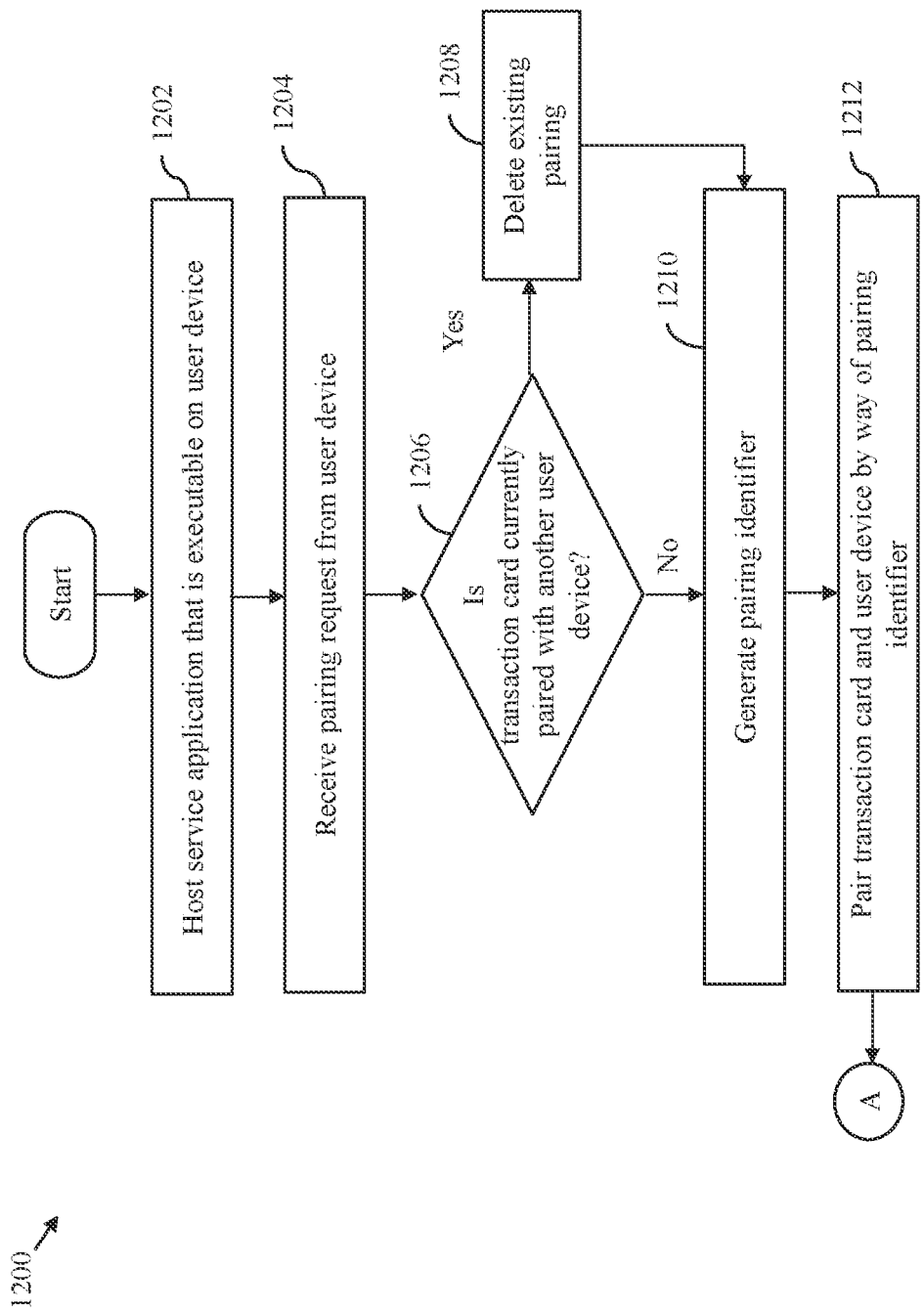
FIGS. 12A-12C, collectively represent a flow chart that illustrates a method for securely presenting the transaction card data of the transaction card, in accordance with an exemplary embodiment of the present disclosure.
Figure 12B:
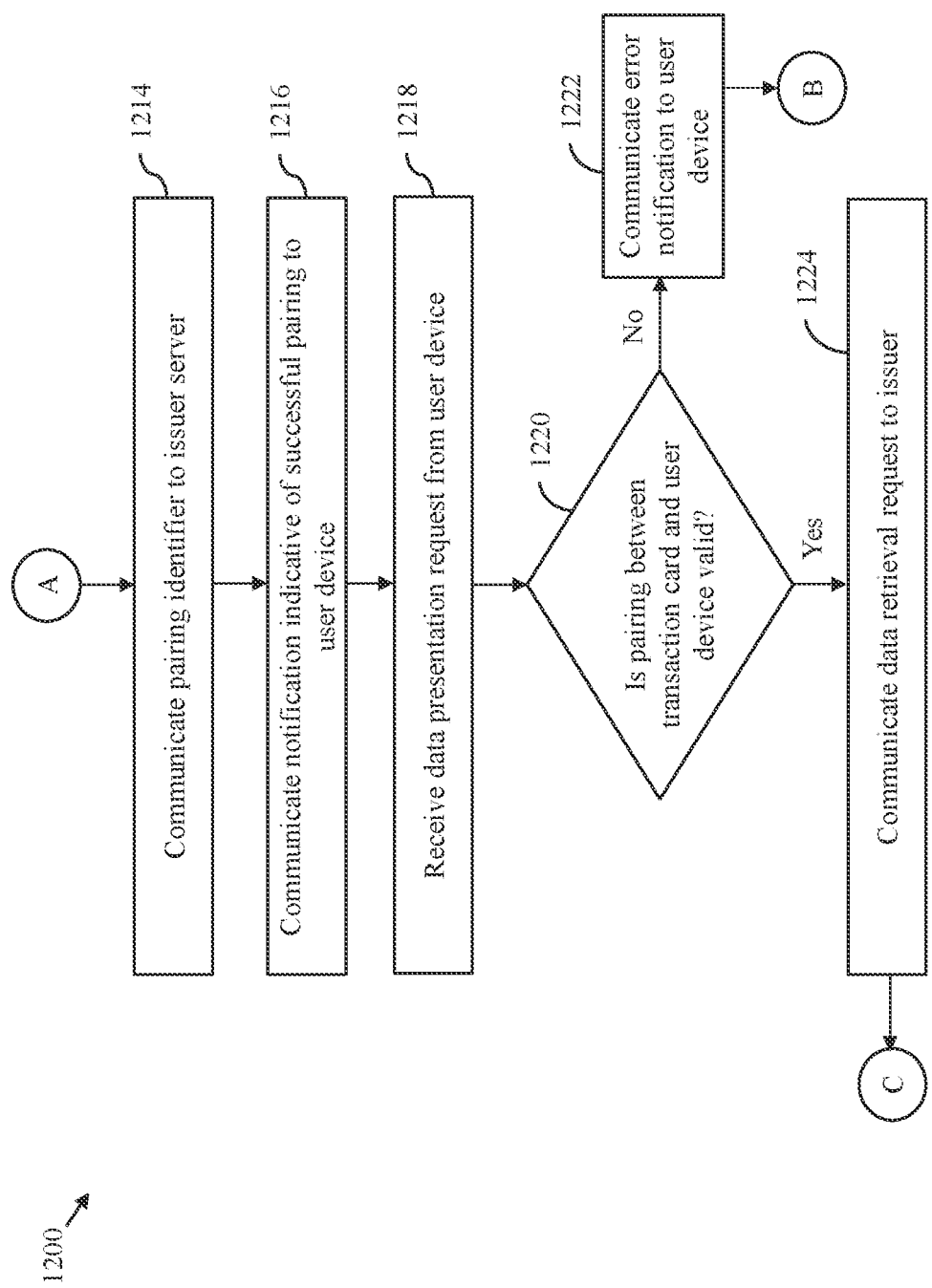
Figure 12C:
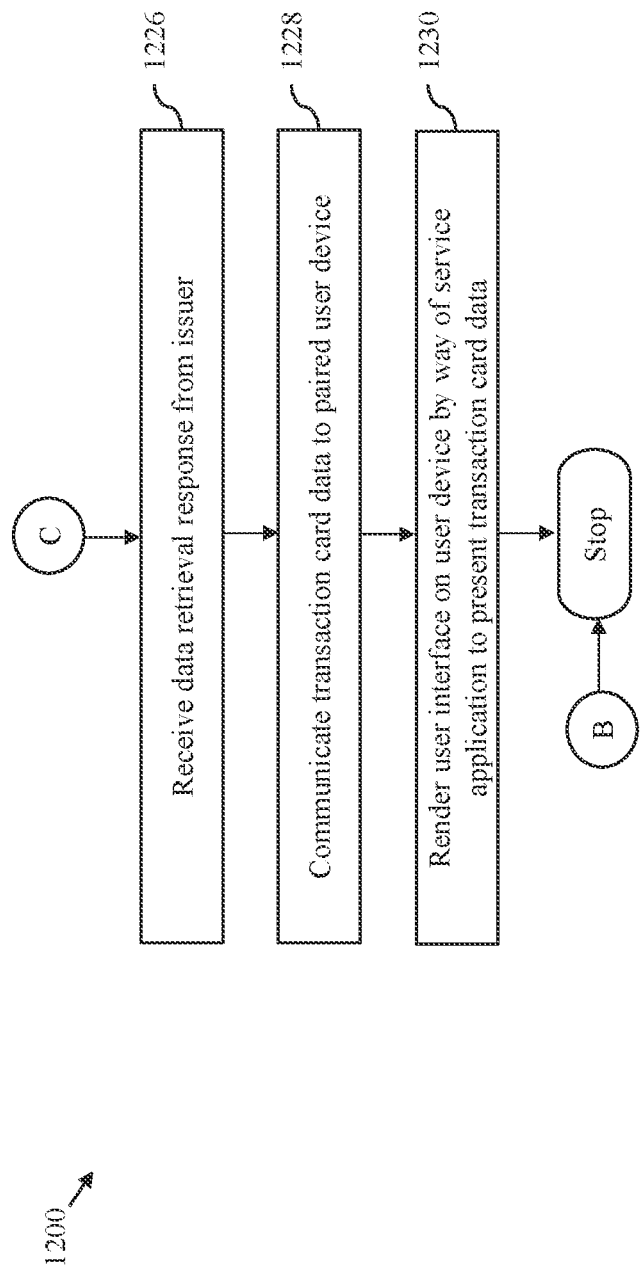

FIGS. 12A-12C, collectively represent a flow chart 1200 that illustrates a method for securely presenting the transaction card data of the transaction card 102, in accordance with an exemplary embodiment of the present disclosure. FIGS. 12A-12C are explained in conjunction with FIGS. 3A-3C, 4A-4C, and 5A-5C. FIGS. 12A-12C describe the scenario where the service application 114 is hosted by the payment network server 108.

With reference to FIG. 12A, at step 1202, the payment network server 108 hosts the service application 114 that is executable on a user device (e.g., the first user device 106 or the second user device 502). The process proceeds to step 1204. At step 1204, the payment network server 108 receives a pairing request (e.g., the first pairing request or the second pairing request) for pairing the transaction card 102 with the user device (e.g., the first user device 106 or the second user device 502). The pairing request is initiated using the service application 114 and includes the transaction card identifier of the transaction card 102 and a user-device identifier of the user device (e.g., the first user-device identifier or the second user-device identifier). The process proceeds to step 1206. At step 1206, the payment network server 108 determines whether the transaction card 102 is paired with another user device, based on the query. If at step 1206, the payment network server 108 determines that the transaction card 102 is paired with another user device (e.g., the first user device 106 or the second user device 502), step 1208 is executed. At step 1208, the payment network server 108 deletes the existing pairing between the transaction card 102 and the other user device and step 1210 is executed. If at step 1206, the payment network server 108 determines that the transaction card 102 is not paired with any user device (e.g., the first user device 106 or the second user device 502), step 1210 is executed. At step 1210, the payment network server 108 generates a pairing identifier (as described in the foregoing description of FIG. 3B). The process proceeds to step 1212. At step 1212, the payment network server 108 pairs the transaction card 102 with the user device by way of the generated pairing identifier (as described in the foregoing description of FIG. 3B). In other words, the user device that communicated the pairing request is paired with the transaction card 102 by way of the generated pairing identifier. The process proceeds to step 1214.

With reference to FIG. 12B, at step 1214, the payment network server 108 communicates the pairing identifier to the issuer server 110. The process proceeds to step 1216. At step 1216, the payment network server 108 communicates a notification (e.g., the first notification or the second notification) to the user device. The notification is indicative of the successful pairing of the user device with the transaction card 102. The service application 114 that is executed on the user device presents the notification to the user 104 on a display (e.g., the first display or the second display) of the user device. The process proceeds to step 1218. At step 1218, the payment network server 108 receives a data presentation request (e.g., the first data presentation request or the second data presentation request) for presenting the transaction card data on the paired user device. The process proceeds to step 1220. At step 1220, the payment network server 108 determines, based on the pairing identifier, whether the pairing between the transaction card 102 and the user device is valid. In other words, the payment network server 108 determines whether the transaction card 102 is paired with the user device (e.g., the first user device 106 or the second user device 502). If at step 1220, the payment network server 108 determines that the pairing between the transaction card 102 and the user device is not valid, step 1222 is executed. At step 1222, the payment network server 108 communicates the error notification to the user device, indicating that there is no pairing between the transaction card 102 and the user device and the process stops. If at step 1220, the payment network server 108 determines that the pairing between the transaction card 102 and the user device is valid, step 1224 is executed. At step 1224, the payment network server 108 communicates a data retrieval request (e.g., the first data retrieval request) to the issuer server 110. The data retrieval request includes the pairing identifier. The issuer server 110 retrieves the transaction card data of the transaction card 102 from the second database 1014, based on the pairing identifier included in the data retrieval request. The issuer server 110 communicates a data retrieval response (e.g., the first data retrieval response) to the payment network server 108. The data retrieval response includes the transaction card data. The process proceeds to step 1226.

With reference to FIG. 12C, at step 1226, the payment network server 108 receives the data retrieval response from the issuer server 110. The process proceeds to step 1228. At step 1228, the payment network server 108 communicates the transaction card data included in the data retrieval response to the user device. At step 1230, the payment network server 108 renders the UI on a display (e.g., the first display or the second display) of the user device by way of the service application 114 to present the transaction card data to the user 104. The user 104 can now view the transaction card data in a secure manner.

Figure 13:
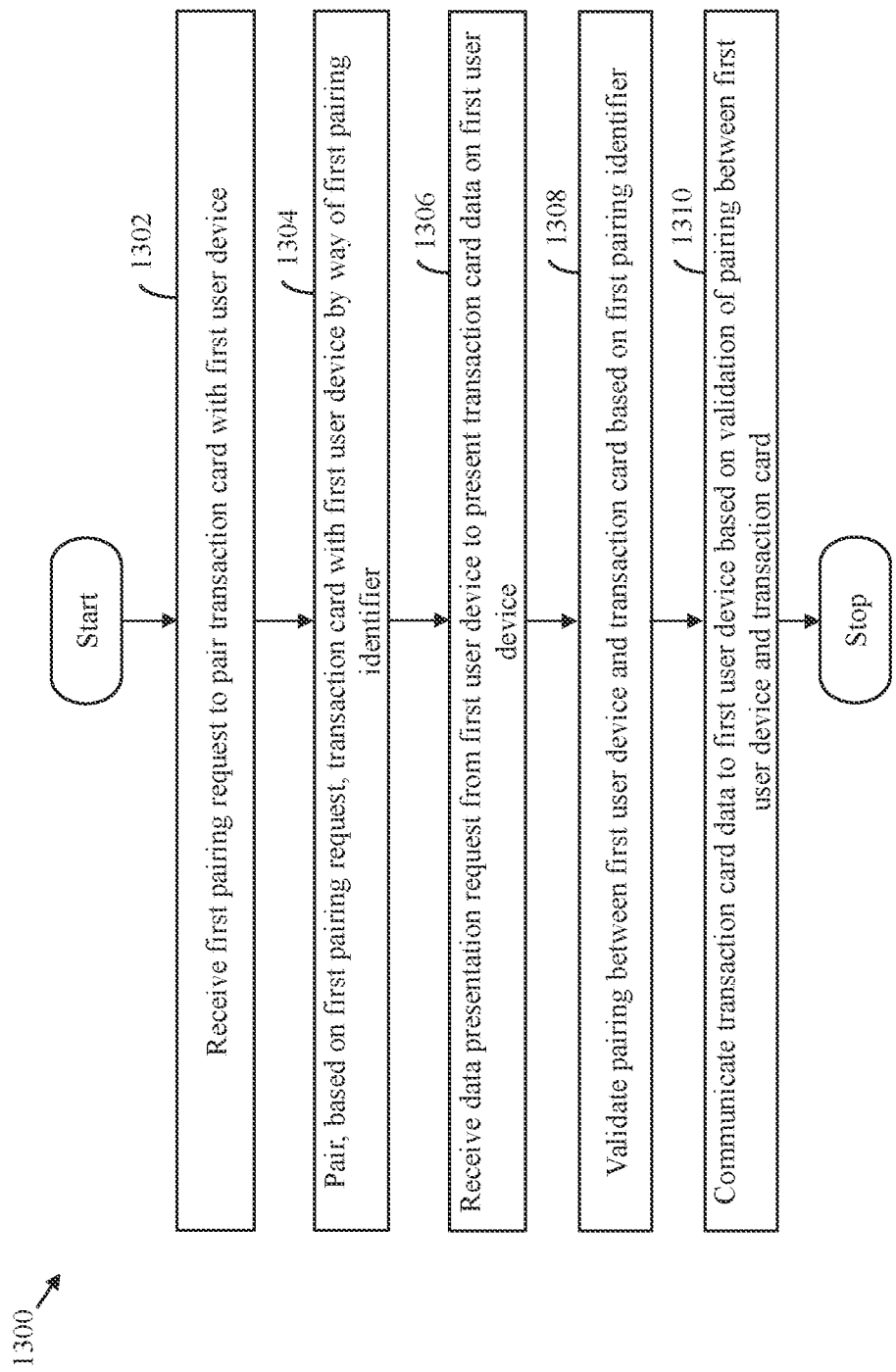
FIG. 13 represents a high-level flow chart that illustrates a method for securely presenting the transaction card data of the transaction card.

FIG. 13 represents a high-level flow chart 1300 that illustrates a method for presenting the transaction card data of the transaction card 102, in accordance with an exemplary embodiment of the present disclosure. At step 1302, the payment network server 108 receives the first pairing request from the first user device 106 to pair the transaction card 102 with the first user device 106. The first pairing request is indicative of the transaction card identifier of the transaction card 102 and the first user-device identifier of the first user device 106. The process proceeds to step 1304. At step 1304, the payment network server 108 pairs the first user device 106 with the transaction card 102 by way of the first pairing request. The process proceeds to step 1306. At step 1306, the payment network server 108 receives the data presentation request to present the transaction card data on the first user device 106. The data presentation request indicative of the transaction card identifier of the transaction card 102 and the first user-device identifier of the first user device 106. The process proceeds to step 1308. At step 1308, in response to the data presentation request, the payment network server 108 validates the pairing between the first user device 106 and the transaction card 102 based on the first pairing identifier. Upon validation of the pairing between the first user device 106 and the transaction card 102, the payment network server 108 retrieves the transaction card data. The process proceeds to step 1310. At step 1310, the payment network server 108 communicates the transaction card data to the first user device 106 based on the validation of the pairing between the first user device 106 and the transaction card 102. The communicated transaction card data is presented on the UI rendered on the first user device 106 by the service application 114.

As described in FIG. 13, the payment network server 108 hosts the service application 114 and the issuer server 110 stores the transaction card data. In a scenario where the issuer server 110 hosts the service application 114, the issuer server 110 may perform functions performed by the payment network server 108 (as described in foregoing descriptions of FIGS. 6A-6C and 7A-7C).

Thus, the environment 100 offers a quick and secure means for presenting transaction card data of a numberless transaction card on a user device. The user 104 initiates pairing and data presentation requests by simply tapping the transaction card 102 on the first user device 106 or by placing the transaction card 102 proximate to the first user device 106. This enhances an ease of use and enables adoption of blank or numberless transaction cards by users. The service application 114 requires the user 104 to log into the service application 114 using a unique username and password and, in some embodiments, prompts the user 104 to provide the PIN whenever the user 104 attempts to initiate a pairing request or a data presentation request. Such features ensure that other users who may have gained unauthorized access to the first user device 106 are pre-empted from accessing the transaction card data. Further, in the interest of securing the transaction card data, the transaction card data is only temporarily presented on the UI and is denied storage on the service application 114 or the first user device 106. This prevents unauthorized access to the transaction card data by malware or other service applications installed on the first user device 106. Adoption of blank or numberless transaction cards and solutions disclosed by the present disclosure may enable users, merchants, acquirers, payment networks, and issuers to save considerable amounts of transaction processing time and money by preventing various types of transaction frauds.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

We claim:

1. A method for securely presenting transaction card data of a transaction card on a first user device, the method performed by a payment network server remote to the first user device, the payment network server providing a temporary display of the transaction card data on the first user device and denying storage of the transaction card data on the first user device, the method comprising:
   receiving login credentials from a service application executing on the first user device, the service application being hosted by the payment network server;
   validating the login credentials;
   after validating the login credentials, receiving, from the service application, a first pairing request, the first pairing request including a first user-device identifier of the first user device and a transaction card identifier of the transaction card, the first user-device identifier including one or more of the following: a contact number associated with the first user device, an international mobile equipment identity (IMEI) number of the first user device, a near field communication (NFC) interface number of the first user device;
   based on the first user-device identifier and the transaction card identifier, transmitting a query to a database;
   based on the query, determining that the transaction card is not paired with the first user device;
   based on the determination, generating a first pairing identifier, the first pairing identifier being based on the transaction card identifier and the first user-device identifier;
   pairing, based on the first pairing request, the transaction card with the first user device, comprising storing the first pairing identifier in the database;
   transmitting the first pairing identifier to an issuer server, the issuer server being associating with an issuer of the transaction card;
   transmitting a first notification to the service application, the first notification being indicative of successfully pairing the transaction card with the first user device;
   receiving, from the service application, a data presentation request, the data presentation request including the transaction card identifier and the first user-device identifier, and a request to receive transaction card data associated with the transaction card for display on the first user device;

using the transaction card identifier and the first user-device identifier received in the data presentation request, creating a generated pairing identifier;

matching the generated pairing identifier to the first pairing identifier;

validating, in response to the data presentation request, the pairing between the first user device and the transaction card based on the matching;

transmitting a data retrieval request to the issuer server, the data retrieval request including the first pairing identifier and a request for the transaction card data;

in response to the data retrieval request, receiving, from the issuer server, a data retrieval response, the data retrieval response including the transaction card data associated with the first pairing identifier;

communicating, to the service application, the transaction card data; and temporarily displaying the transaction card data on a user interface rendered on the first user device by the service application while denying storage of the transaction data on the service application and the first user device.

2. The method of claim 1, wherein the transaction card and the first user device support near-field communication (NFC).

3. The method of claim 2, wherein the first pairing request and the data presentation request are communicated by the first user device to the payment network server based on NFC interaction between the first user device and the transaction card.

4. The method of claim 1, further comprising storing the transaction card data in association with the first pairing identifier in the database based on the pairing between the transaction card and the first user device.

5. The method of claim 4, further comprising retrieving from the database the transaction card data to be communicated to the first user device.

6. The method of claim 1, further comprising:

receiving from a second user device, a second pairing request, the second pairing request including a second user-device identifier of the second user device and the transaction card identifier;

deleting the pairing between the transaction card and the first user device based on the received second pairing request, comprising deleting the first pairing identifier from the database; and generating a second pairing identifier, the second pairing identifier being based on the transaction card identifier and the second user-device identifier; and pairing the transaction card with the second user device, comprising storing the second pairing identifier in the database.

7. The method of claim 1, wherein an exterior surface of the transaction card is devoid of the transaction card data, and wherein the transaction card data includes at least a transaction card number, an expiry date, or a card verification value.

8. A system for securely presenting transaction card data of a transaction card on a first user device, by providing a temporary display of the transaction card data on the first user device and denying storage of the transaction card data on the first user device, the system comprising:

a first user device, the first user having a service application executing thereon;

a database; and a payment network server hosting the service application, the payment network server comprising:

a processor; and a memory storing instructions thereon, the instructions, when executed by the processor, causing the processor to:

receive login credentials from the service application executing on the first user device;

validate the login credentials;

after validating the login credentials, receive, from the service application, a first pairing request, the first pairing request including a first user-device identifier of the first user device and a transaction card identifier of the transaction card, the first user-device identifier including one or more of the following: a contact number associated with the first user device, an international mobile equipment identity (IMEI) number of the first user device, a near field communication (NFC) interface number of the first user device;

based on the first user-device identifier and the transaction card identifier, transmit a query to the database;

based on the query, determine that the transaction card is not paired with the first user device;

based on the determination, generate a first pairing identifier, the first pairing identifier being based on the transaction card identifier and the first user-device identifier;

pair, based on the first pairing request, the transaction card with the first user device, comprising storing the first pairing identifier in the database;

transmit the first pairing identifier to an issuer server, the issuer server being associating with an issuer of the transaction card;

transmit a first notification to the service application, the first notification being indicative of successfully pairing the transaction card with the first user device;

receive, from the service application, a data presentation request, the data presentation request including the transaction card identifier and the first user-device identifier, and a request to receive transaction card data associated with the transaction card for display on the first user device;

using the transaction card identifier and the first user-device identifier received in the data presentation request, creating a generated pairing identifier;

matching the generated pairing identifier to the first pairing identifier;

transmit a data retrieval request to the issuer server, the data retrieval request including the first pairing identifier and a request for the transaction card data;

in response to the data retrieval request, receive, from the issuer server, a data retrieval response, the data retrieval response including the transaction card data associated with the first pairing identifier;

validate, in response to the data presentation request, the pairing between the first user device and the transaction card based on the matching;

communicate, to the service application, the transaction card data; and temporarily display the transaction card data on a user interface rendered on the first user device by the service application while denying storage of the transaction data on the service application and the first user device.

9. The system of claim 8, wherein the transaction card and the first user device support near-field communication (NFC).

10. The system of claim 9, wherein the first user device communicates the first pairing request and the data presentation request to the processing circuitry based on NFC interaction between the first user device and the transaction card.

11. The system of claim 8, wherein the instructions cause the processor to store the transaction card data in association with the first pairing identifier in the database based on the pairing between the transaction card and the first user device.

12. The system of claim 11, wherein the instructions cause the processor to retrieve, from the database, the transaction card data to be communicated to the first user device.

13. The system of claim 8, wherein the instructions cause the processor to:

receive, from a second user device, a second pairing request, the second pairing request including a second user-device identifier of the second user device and the transaction card identifier;

delete the pairing between the transaction card and the first user device based on the received second pairing request, comprising deleting the first pairing identifier from the database; and pair the transaction card with the second user device, comprising storing the second pairing identifier in the database.

14. The system of claim 8, wherein an exterior surface of the transaction card is devoid of the transaction card data and wherein the transaction card data includes at least a transaction card number, an expiry date, or a card verification value.

* * * * *